(12) United States Patent
Coman et al.

(10) Patent No.: US 12,106,760 B2
(45) Date of Patent: Oct. 1, 2024

(54) SYSTEMS AND METHODS USING NATURAL LANGUAGE PROCESSING TO IDENTIFY IRREGULARITIES IN A USER UTTERANCE

(71) Applicant: Capital One Services, LLC, McLean, VA (US)

(72) Inventors: Alexandra Coman, Tysons Corner, VA (US); Rui Zhang, New York, NY (US); Sara Mikulic, McLean, VA (US); Liwei Dai, Oakton, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 75 days.

(21) Appl. No.: 17/077,652

(22) Filed: Oct. 22, 2020

(65) Prior Publication Data
US 2022/0130398 A1  Apr. 28, 2022

(51) Int. Cl.
*G10L 17/22* (2013.01)
*G10L 15/08* (2006.01)
(Continued)

(52) U.S. Cl.
CPC ............ *G10L 17/22* (2013.01); *G10L 15/083* (2013.01); *G10L 15/1815* (2013.01);
(Continued)

(58) Field of Classification Search
CPC ... G10L 17/22; G10L 15/083; G10L 15/1815; G10L 15/1822; G10L 15/22; G10L 2015/225
See application file for complete search history.

(56) References Cited

U.S. PATENT DOCUMENTS 8,463,594 B2   6/2013  Au
9,009,046 B1 *  4/2015  Stewart .................. G10L 15/22
                                                704/270.1
(Continued)

FOREIGN PATENT DOCUMENTS

KR           102031767 B1    10/2019
WO           2015062284 A1    5/2015

*Primary Examiner* — Daniel C Washburn
*Assistant Examiner* — James Boggs
(74) *Attorney, Agent, or Firm* — TROUTMAN PEPPER HAMILTON SANDERS LLP; Christopher J. Forstner; John A. Morrissett

(57) ABSTRACT

Systems and methods for identifying irregularities during an automated user interaction are disclosed. The system may receive a communication and extract a perceived irregularity from the communication. The system may generate a first explanatory hypothesis associated with the perceived irregularity having an associated confidence measurement. The system may selectively retrieve user information based on the generated hypothesis and generate an investigational strategy associated with the hypothesis. In response to the investigational strategy, the system may receive a user communication, and the system may update the confidence measurement based on the user communication. When the confidence measurement exceeds the predetermined confidence threshold the system may validate the perceived irregularity as a true irregularity and provide a computer-generated dialogue response indicative of a proposed resolution of the irregularity. When no existing hypothesis has a confidence measurement exceeding the threshold, the system may generate a novel hypothesis to be validated.

23 Claims, 5 Drawing Sheets

(51) Int. Cl.
   *G10L 15/18*   (2013.01)
   *G10L 15/22*   (2006.01)
(52) U.S. Cl.
   CPC .......... *G10L 15/1822* (2013.01); *G10L 15/22* (2013.01); *G10L 2015/225* (2013.01)

(56) References Cited

U.S. PATENT DOCUMENTS

| | | | |
|---|---|---|---|
| 9,037,472 B2* | 5/2015 | Mauro | G06Q 20/305 |
| | | | 704/275 |
| 9,736,308 B1 | 8/2017 | Wu et al. | |
| 10,276,170 B2* | 4/2019 | Gruber | G10L 15/22 |
| 10,297,253 B2* | 5/2019 | Walker | G10L 15/1815 |
| 10,332,505 B2* | 6/2019 | Zoller | G10L 13/027 |
| 10,403,273 B2* | 9/2019 | Lee | G06F 16/3329 |
| 10,630,838 B2* | 4/2020 | McGann | G06N 7/005 |
| 10,698,581 B2* | 6/2020 | Krishnan | G06F 8/34 |
| 10,909,152 B2* | 2/2021 | Canim | G10L 15/16 |
| 11,128,579 B2* | 9/2021 | Magliozzi | H04L 51/066 |
| 11,231,946 B2* | 1/2022 | Liu | G10L 15/187 |
| 11,238,239 B2* | 2/2022 | Liu | G06Q 10/00 |
| 11,393,456 B1* | 7/2022 | Guo | G10L 15/063 |
| 11,688,022 B2* | 6/2023 | Aghajanyan | G06Q 10/109 |
| | | | 704/9 |
| 11,843,565 B2* | 12/2023 | Lee | H04L 51/02 |
| 2016/0306974 A1 | 10/2016 | Turgeman et al. | |
| 2020/0012954 A1* | 1/2020 | Botea | G06F 40/35 |

\* cited by examiner

SYSTEMS AND METHODS USING NATURAL LANGUAGE PROCESSING TO IDENTIFY IRREGULARITIES IN A USER UTTERANCE

FIELD

The disclosed technology relates to systems and methods for autonomously identifying irregularities in a user utterance using natural language processing, and more particularly systems and methods for generating novel investigational hypotheses to autonomously validate and resolve irregularities.

BACKGROUND

Many organizations utilize service representatives to interact with users in order to resolve user issues. These organizations often rely on call centers staffed with numerous human representatives, which may be both cost inefficient for the organization and time inefficient for users who have to wait on hold for a human representative to assist them. Accordingly, many organizations have attempted to automate the user issue resolution process by leveraging interactive voice response (IVR) systems and/or programs that generate automatic written, auditory, and/or video responses to user communications through various communication channels (e.g., phone, video, instant messenger, email, etc.). However, while such automated systems are able to solve user issues that have been previously scripted, they struggle to resolve user issues that are dissimilar to issues previously encountered by the system.

Accordingly, there is a need for more robust automated dialogue systems capable of accurately identifying user issues and generating novel hypotheses associated with the resolution of user issues, including those not previously encountered by the system. Embodiments of the present disclosure are directed to this and other considerations.

SUMMARY

Disclosed herein are systems and methods for resolving irregularities. Consistent with the disclosed embodiments, a system is provided for collaboratively resolving irregularities. The system includes one or more processors and memory in communication with the one or more processors and storing instructions that, when executed by the one or more processors, cause the system to perform one or more steps of a method for resolving irregularities. The system may receive a communication comprising a utterance associated with a first user. The utterance may include information pertaining to one or more irregularities associated with a useraccount, an order, etc. The system may extract a perceived irregularity from the communication/utterance and generate a hypothesis related to validating the perceived irregularity as a true irregularity associated with the first user, and potentially, autonomously resolving the validated irregularity by providing a computer-generated dialogue response indicating a proposed resolution of the perceived irregularity based on the validation. The system may generate an investigational strategy associated with the generated hypothesis (e.g., generating a response requesting additional information from the user, asking the user to confirm/deny various factual findings related to the perceived irregularity, etc.), and in response, may receive one or more additional utterances providing additional information and/or observations to the system. The system may update a confidence measurement associated with the generated hypothesis based in part on the one or more received additional utterances, and in response to determining that the confidence measurement meets or exceeds the first predetermined confidence threshold, validate the perceived irregularity as a true irregularity. When there are one or more available actions that the system may take to resolve the irregularity, the system may additionally resolve the first irregularity by providing a computer-generated dialogue response indicating a proposed resolution of the perceived irregularity based on the validation. In some embodiments, the perceived irregularity may be extracted by a Natural Language Processing (NLP) device. In some embodiments, the perceived irregularity may be related to a product or service.

Consistent with the disclosed embodiments, a computer implemented method for resolving irregularities is disclosed. The method may include receiving a communication including an utterance associated with a first user, and extracting, by a Natural Language Processing (NLP) device a perceived irregularity related to a topic of the utterance based on the communication. The method may include generating a hypothesis associated with the perceived irregularity, and determining a confidence measurement indicative of how well the hypothesis explains the perceived irregularity. The method may include retrieving previously stored user information based on the hypothesis, and generating a first investigational strategy based on the hypothesis and the previously stored information. The method may include generating a plurality of investigational responses which may be used to communicate with the user and elicit additional relevant information necessary for validating and/or resolving the irregularity. The method may include determining a priority among the plurality of investigational responses and selecting an investigational response to elicit additional information from the user. After receiving another communication or utterance, the method may include updating the confidence measurement associated with the hypothesis, and when the confidence measurement exceeds a predetermined threshold, the method may include validating the perceived irregularity as a first true (e.g., validated) irregularity. In some embodiments, the topic of the utterance may be related to a product or service associated with the user.

Consistent with the disclosed embodiments, another system is provided for resolving irregularities. The system includes one or more processors and memory in communication with the one or more processors and storing instructions that, when executed by the one or more processors, cause the system to perform one or more steps of a method for resolving irregularities. The system may extract a perceived irregularity from a communication or utterance and generate a hypothesis related to validating the perceived irregularity. The system may generate a confidence measurement associated with the hypothesis and selectively retrieve prestored information associated with the user based on the generated hypothesis. The system may generate an investigational strategy associated with the generated hypothesis (e.g., generating a response for requesting additional information from the user, asking the user to confirm/deny various factual findings related to the perceived irregularity, etc.), and in response, may receive one or more additional utterances from the user providing additional information and/or observations to the system. The system may update the confidence measurement associated with the generated hypothesis based in part on the one or more received additional utterances. The system may determine that no previously generated hypothesis has a confidence measurement that exceeds the predetermined threshold, and in response, generate a novel hypothesis associated with the perceived irregularity. The system may validate the perceived irregularity by retrieving additional information associated with the user, and/or by prompting the user for one or more additional utterances. Once the system validates the perceived irregularity as a true irregularity, the system may provide a computer-generated dialogue response indicating a proposed resolution of the perceived irregularity based on the validation.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
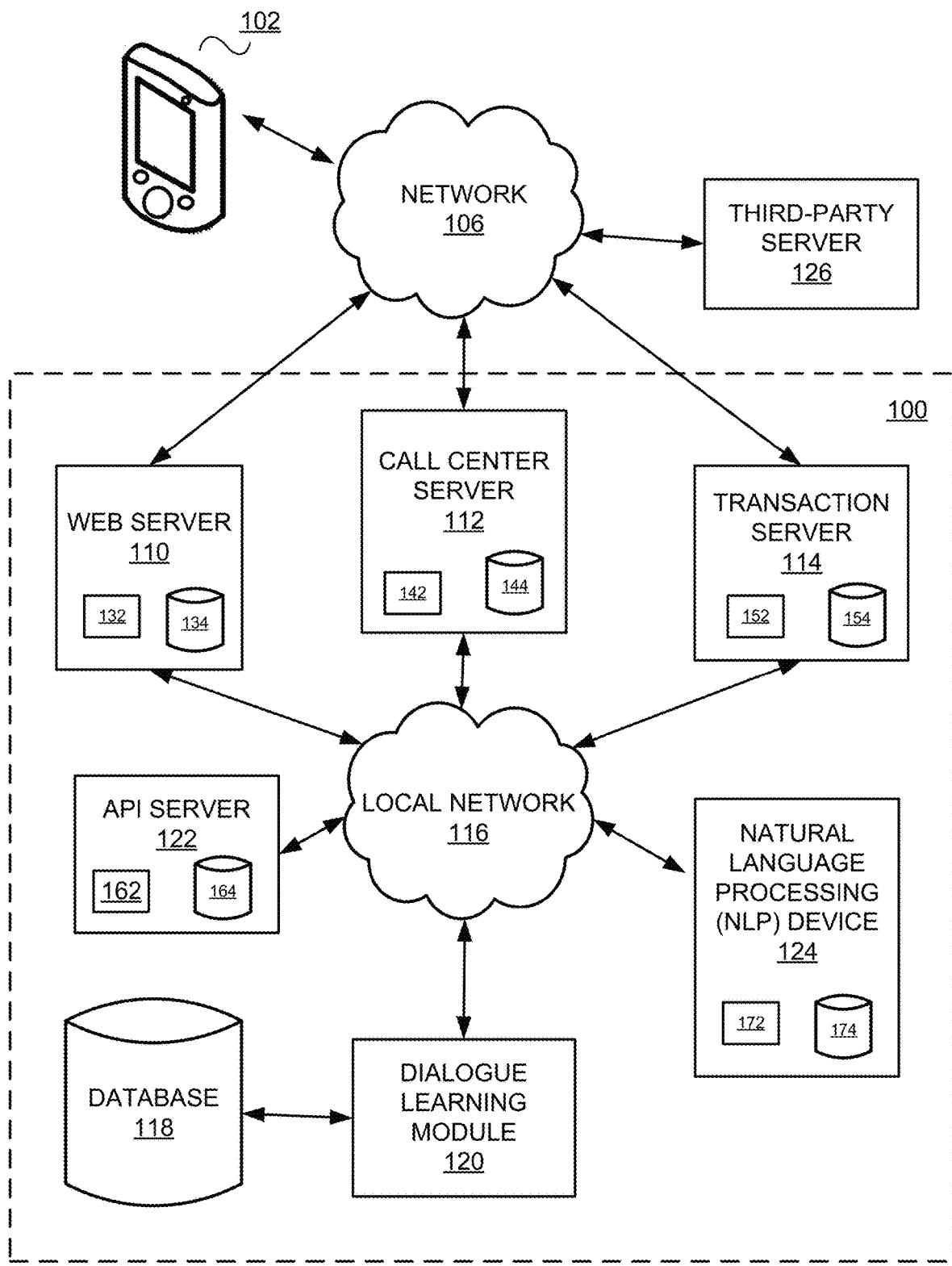
FIG. 1 is a block diagram of an example system 100 that may be used to validate and resolve a perceived irregularity using natural language processing and dialogue generation.

According to certain example implementations of the disclosed technology, systems and methods are disclosed herein for autonomously validating and/or resolving a user irregularity during an automated communication interaction based on one or more utterances and/or responses received from the user and/or an automated machine-based dialogue with the user. For example, in one aspect, a system is provided for autonomously receiving and interpreting a user communication to determine, using a dialogue learning module and natural language processing (NLP) methods, whether such communication from the user includes an utterance that signifies a perceived irregularity.

The dialogue learning module may access one or more databases to retrieve details related to the user including, but not limited to, a user profile, user interaction history, etc. In some examples, the user interaction history may include order history, shipment tracking, proof of delivery, billing information, etc. In certain implementations, the dialogue learning module device may further retrieve rules from a rule-based platform that may be utilized to verify the perceived irregularity as a true customer irregularity or invalidate the perceived irregularity. For example, the rule-based platform may include algorithmic rules developed based on case-based reasoning techniques, for example by extracting stored knowledge from previous customer interactions. The rule-based platform may additionally include information related to, for example, rules related to calculating the price of shipping, date ranges for special offers and associated prerequisites, prerequisites for special pricing, etc. that may be compared with the customer utterances for determining whether a perceived customer irregularity (e.g., "I was supposed to get free shipping with my order of three soda cans, but I was charged the standard shipping rate!") is a true customer irregularity or invalid (e.g., when the free shipping offer has already expired).

In certain implementations, the dialogue learning module may prepare dialog modifying commands based on the user utterances, the perceived irregularity, user and/or order history data available to the system, and/or associated rules from the rule-based platform. The dialogue learning module may use such dialog modifying commands to program a natural language processing (NLP) device to, for example, modify a response with details related to the user's communication. The dialog modifying commands, for example, may be utilized by the NLP device to generate/revise a natural language response that can include: a request for verification of certain details related to the user's communication, a confirmation of a detected assertion, a confirmation and/or correction of a user's irregularity, a response disputing one or more assertions extracted by NLP device from one or more user utterances, a response disputing a perceived irregularity, a request for additional information from the user regarding the perceived irregularity, etc. Such interactions may be carried out by the systems and methods disclosed herein without involving a human service agent. Accordingly, the dialogue learning module may program the NLP device and may use feedback received from the user to further revise or update the dialog modifying commands in an iterative manner. When the system extracts a perceived irregularity, the dialogue learning module may generate one or more hypotheses each having a respective confidence measurement, and may select a first hypothesis based on a ranking of the hypotheses by confidence measurement. The dialogue learning module may determine one or more investigational strategies, which may then be used to prepare the dialogue modifying commands for the NLP device.

The NLP device may extract perceived irregularities from statements asserted by the user as well as questions posed by the user. For example, "I was charged for shipping!!!" can reasonably be understood to imply that the user expected not to be charged for shipping and the perceived user irregularity is associated with shipping charges for a recent user order.

In an utterance, the user may provide an argument for why the perceived irregularity is a valid irregularity. In such a case, the system may identify the argument, the assertions of the argument, and the reasoning of the argument, and the system may verify the assertions and the correctness of the reasoning, for example, by using one or more of the rule-based platform and the machine learning module of the dialogue learning module. Utterances could include, for example, an assertion that, in the customer's perception, supports the validity of the perceived irregularity as a true customer irregularity. Utterances of this type may include or imply the phrase "given that". For example, the utterance: "Why was I charged for shipping? I spent more than $100!" could be rewritten as "Why was I charged for shipping, given that I spent more than $100?" More broadly, such an argument may include more than one assertion and can describe the context surrounding the discrepancy to a greater extent. Such arguments can be story-like, arbitrarily long, and may contain multiple assertions and complex reasoning.

For utterances that do not include such an argument, a full, correct explanation could be very broad, including various possible factors leading to the perceived irregularity. Each assertion contained in the argument may be considered an observation for the system to attempt to explain by generating a plurality of hypotheses that attempt to address every observation received by the system.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a block diagram of an example system 100 that may be used to validate and resolve a perceived irregularity using natural language processing and dialogue generation. The system 100 may be configured to perform one or more processes that can adaptively generate responses based on an evolving context associated with customer interactions, orders, goods, services, etc. The components and arrangements shown in FIG. 1 are not intended to limit the disclosed embodiments as the components used to implement the disclosed processes and features may vary. As shown, system 100 may interact with a user device 102 via a network 106. In certain example implementations, the system 100 may include a web server 110, a call center server 112, a transaction server 114, a local network 116, an dialogue learning module 120, a database 118, an API server 122, and an Natural Language Processing device 124 (which may be referred to herein as an NLP device 124).

In some embodiments, a user may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with the network 106 and ultimately communicating with one or more components of the system 100. In some embodiments, the user device 102 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from an entity associated with the system 100. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The network 106 may be of any suitable type, including individual connections via the internet such as cellular or WiFi™ networks. In some embodiments, the network 106 may connect terminals, services, and mobile devices using direct connections such as radio- frequency identification (RFID), near-field communication (NFC), Bluetooth™M, low-energy Bluetooth™M (BLE), WiFi™M, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 106 may include any type of computer networking arrangement used to exchange data. For example, the network 106 may be the Internet, a private data network, virtual private network using a public network, and/or other suitable connection(s) that enable(s) components in the system 100 environment to send and receive information between the components of the system 100. The network 106 may also include a public switched telephone network ("PSTN") and/or a wireless network.

In accordance with certain example implementations, a third-party server 126 may be in communication with the system 100 via the network 106. In certain implementations, the third-party server 126 can include a computer system associated with an entity (other than the entity associated with the system 100 and its customers) that performs one or more functions associated with the customers. For example, the third-party server 126 can include an automated teller machine (ATM) system that allows a customer to withdraw money from an account managed via an organization that controls the system 100. As another example, the third-party server 126 may include a computer system associated with a product repair service that submits a warranty claim for a product that a customer purchased from the organization that controls the system 100.

The system 100 may be associated with and optionally controlled by an entity such as a business, corporation, individual, partnership, or any other entity that provides one or more of goods, services, and consultations to individuals such as users or customers. The system 100 may include one or more servers and computer systems for performing one or more functions associated with products and/or services that the organization provides. Such servers and computer systems may include, for example, the web server 110, the call center server 112, and/or the transaction server 114, as well as any other computer systems necessary to accomplish tasks associated with the organization or the needs of users (which may be customers of the entity associated with the organization). The web server 110 may include a computer system configured to generate and provide one or more websites accessible to users, as well as any other individuals involved in an organization's normal operations. The web server 110, for example, may include a computer system configured to receive communications from the user device 102 via for example, a mobile application, a chat program, an instant messaging program, a voice-to-text program, an SMS message, email, or any other type or format of written or electronic communication. The web server 110 may have one or more processors 132 and one or more web server databases 134, which may be any suitable repository of website data. Information stored in the web server 110 may be accessed (e.g., retrieved, updated, and added to) via the local network 116 (and/or the network 106) by one or more devices (e.g., the dialogue learning module 120 and/or the NLP device 124) of the system 100. In some embodiments, one or more processors 132 may be used to implement an automated natural language dialogue system that may interact with a user via different types of communication channels such as a website, mobile application, instant messaging application, SMS message, email, phone, or any other type of spoken or written electronic communication. When receiving an incoming message from, for example, the user device 102, the web server 110 may be configured to determine the type of communication channel the user device 102 used to generate the incoming message.

The call center server 112 may include a computer system configured to receive, process, and route telephone calls and other electronic communications between a user operating a user device 102 and the dialogue learning module 120. The call center server 112 may have one or more processors 142 and one or more call center databases 144, which may be any suitable repository of call center data. Information stored in the call center server 112 may be accessed (e.g., retrieved, updated, and added to) via the local network 116 (and/or network 106) by one or more devices of the system 100. In some embodiments, the call center server processor 142 may be used to implement an interactive voice response (IVR) system that interacts with the user over the phone.

The transaction server 114 may include a computer system configured to process one or more transactions involving an account associated with users or customers, or a request received from users or customers. In some embodiments, transactions can include, for example, a product/service purchase, product/service return, financial transfer, financial deposit, financial withdrawal, financial credit, financial debit, dispute request, warranty coverage request, shipping information, delivery information, and any other type of transaction associated with the products and/or services that an entity associated with system 100 provides to individuals such as customers. The transaction server 114 may have one or more processors 152 and one or more transaction server databases 154, which may be any suitable repository of transaction data. Information stored in transaction server 114 may be accessed (e.g., retrieved, updated, and added to) via the local network 116 (and/or network 106) by one or more devices of the system 100.

In some embodiments, the transaction server 114 tracks and stores event data regarding interactions between a third-party, such as a third-party server 126, with the system 100, and on behalf of the individual users or customers. For example, the transaction server 114 may track third-party interactions such as purchase requests, refund requests, shipping status, shipping charges, warranty claims, account withdrawals and deposits, and any other type of interaction that the third-party server 126 may conduct with the system 100 on behalf of an individual such as a user or customer.

The local network 116 may include any type of computer networking arrangement used to exchange data in a localized area, such as WiFi™, Bluetooth™M Ethernet, and other suitable network connections that enable components of the system 100 to interact with one another and to connect to the network 106 for interacting with components in the system 100 environment. In some embodiments, the local network 116 may include an interface for communicating with or linking to the network 106. In other embodiments, certain components of the system 100 may communicate via the network 106, without a separate local network 116.

In accordance with certain example implementations of the disclosed technology, the dialogue learning module 120, which is described more fully below with reference to FIG. 2, may include one or more computer systems configured to compile data from a plurality of sources, such as the web server 110, the call center server 112, the transaction server 114, and/or the database 118. The dialogue learning module 120 may correlate compiled data, analyze the compiled data, arrange the compiled data, generate derived data based on the compiled data, and store the compiled and derived data in a database such as the database 118. According to some embodiments, the database 118 may be a database associated with an organization and/or a related entity that stores a variety of information relating to users, customers, transactions, and business operations. The database 118 may also serve as a back-up storage device and may contain data and information that is also stored on, for example, databases 134, 144, 154, 164, 174 (and 280, as will be discussed with reference to FIG. 2). The database 118 may be accessed by the dialogue learning module 120 and may be used to store records of every interaction, communication, and/or transaction a particular user or customer has had with the organization and/or its related entity in the past to enable the creation of an ever-evolving customer context that may enable the dialogue learning module 120, in conjunction with the NLP device 124, to generate hypotheses associated with perceived irregularities that may be extracted from one or more utterances.

In certain example implementations, the API server 122 may include one or more computer systems configured to execute one or more application program interfaces (APIs) that provide various functionalities related to the operations of the system 100. In some embodiments, the API server 122 may include API adapters that enable the API server 122 to interface with and utilize enterprise APIs maintained by an organization and/or an associated entity that may be housed on other systems or devices. In some embodiments, APIs can provide functions that include, for example, retrieving user account information, modifying user account information, executing a transaction related to an account, scheduling a payment, authenticating a user, updating a user account to opt-in or opt-out of notifications, and any other such function related to management of user profiles and accounts. The API server 122 may include one or more processors 162 and one or more API databases 164, which may be any suitable repository of API data. Information stored in the API server 122 may be accessed (e.g., retrieved, updated, and added to) via the local network 116 (and/or network 106) by one or more devices (e.g., dialogue learning module 120) of system 100. In some embodiments, the API processor 162 may be used to implement one or more APIs that can access, modify, and retrieve user account information.

In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, the transaction server 114) to exchange data with a server that implements the API (such as, for example, the API server 122), in a request-response pattern. In certain embodiments, the request-response pattern defined by the API may be configured in a synchronous fashion and may require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/j son" content-type. In another aspect, an API design may also require the server implementing the API return messages in JSON format in response to the request calls from the client.

In accordance with certain example implementations of the disclosed technology, the NLP device 124 may include a computer system configured to receive and process incoming messages and determine a meaning of the incoming message. For example, the NLP device 124 may be configured to receive and execute commands (for example, from the dialogue learning module 120) that instructs the NLP device 124 to determine the meaning of the incoming dialogue message. In certain example implementations, the dialogue learning module 120 may issue dialog modifying commands to the NLP device 124, for example, that instruct the NLP device 124 to formulate/revise a response based on rules and/or determined information related to the communication, specifics related to an order, etc. Thus, in certain example implementations, the dialogue learning module 120 may program the NLP device 124.

As will be discussed further with reference to FIG. 3, the NLP device 124 may be configured to continuously or intermittently listen for and receive commands from a command queue to determine if there are any new commands directed to the NLP device 124. Upon receiving and processing an incoming dialogue message, the NLP device 124 may output the meaning of an incoming dialogue message in a format that other devices can process. For example, the NLP device 124 may receive an incoming message stating: "Why was I charged for shipping?" and may determine that this statement represents a request for an explanation related to a perceived irregularity. The NLP device 124 may be configured to output an event representing the meaning of the incoming message to an event queue for processing by another device of the system 100. In some embodiments, the NLP device 124 may be configured to generate a natural language phrase in response to receiving a command. Accordingly, in some embodiments, the NLP device 124 may be configured to output an event that contains data representing natural language.

The NLP device 124 may include one or more processors 172 and one or more NLP databases 174, which may be any suitable repository of NLP data. Information stored in the NLP device 124 may be accessed (e.g., retrieved, updated, and added to) via the local network 116 (and/or network 106) by one or more devices (e.g., the dialogue learning module 120) of system 100. In some embodiments, the NLP processor 172 may be used to implement an NLP system that can determine the meaning behind a string of text and convert it to a form that can be understood by other devices.

Although described in the above embodiments as being performed by the web server 110, the call center server 112, the transaction server 114, the dialogue learning module 120, the database 118, the API server 122, and the NLP device 124, some or all of those functions may be carried out by a single computing device.

For ease of discussion, embodiments may be described in connection with the generation of automated natural language dialogue in response to an electronic text communication such as an SMS message, chat program message, or an email. It is to be understood, however, that disclosed embodiments are not limited to discourse and/or dialogue in response to written electronic messages and may be used in many other contexts, such as, for example, generating automated natural language dialogue in response to an oral communication such as a phone call. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 2:
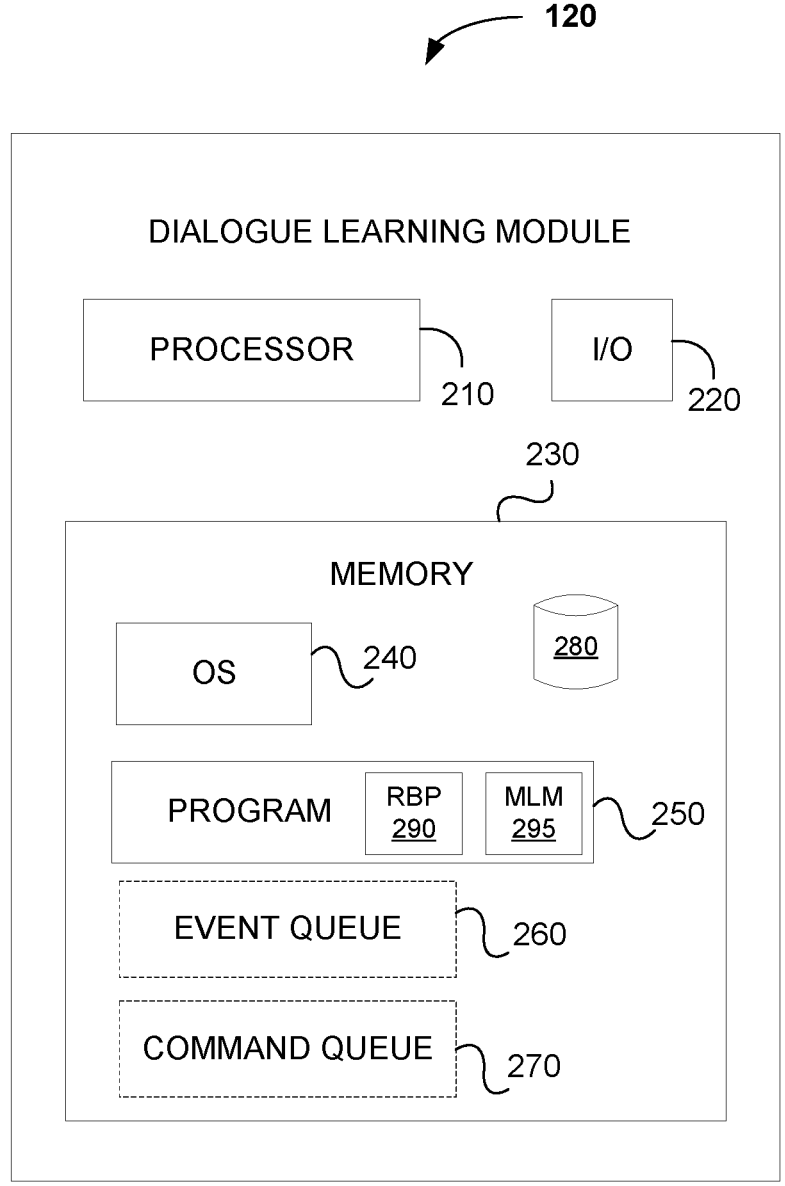
FIG. 2 is a block diagram of an example dialogue learning module 120, as shown in FIG. 1, with additional details.

FIG. 2 is a block diagram (with additional details) of the example dialogue learning module 120, as also depicted in FIG. 1. According to some embodiments, the user device 102, the web server 110, the call center server 112, the transaction server 114, the API server 122, the NLP device 124, and the third-party server 126, as depicted in FIG. 1, may have a similar structure and components that are similar to those described with respect to dialogue learning module 120 shown in FIG. 2. As shown, the dialogue learning module 120 may include a processor 210, an input/output ("I/O") device 220, a memory 230 containing an operating system ("OS") 240 and a program 250. In certain example implementations, the dialogue learning module 120 may be a single server or may be configured as a distributed computer system including multiple servers or computers that interoperate to perform one or more of the processes and functionalities associated with the disclosed embodiments. In some embodiments, the dialogue learning module 120 may further include a peripheral interface, a transceiver, a mobile network interface in communication with the processor 210, a bus configured to facilitate communication between the various components of the dialogue learning module 120, and a power source configured to power one or more components of the dialogue learning module 120.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the dialogue learning module 120 may include one or more storage devices configured to store information used by the processor 210 (or other components) to perform certain functions related to the disclosed embodiments. In one example, the dialogue learning module 120 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the dialogue learning module 120 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the dialogue learning module 120 may include the memory 230 that may include one or more programs 250 to perform one or more functions of the disclosed embodiments. For example, in some embodiments, the dialogue learning module 120 may additionally manage dialogue and/or other interactions with the user via a program 250.

In certain example implementations, the program 250 may include a rule-based platform 290 for generating zero or more commands in response to processing an event in accordance with a set of predefined rules. In some embodiments, the dialogue learning module 120 may include a trained machine learning model 295 for generating zero or more commands in response to processing an event, in accordance with a model that may be continuously or intermittently updated. Moreover, the processor 210 may execute one or more programs 250 located remotely from the system 100 (such as the system shown in FIG. 1). For example, the system 100 may access one or more remote programs 250 (such as the rule-based platform 290 or the trained machine learning model 295), that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a user information database 280 for storing related data to enable the dialogue learning module 120 to perform one or more of the processes and functionalities associated with the disclosed embodiments.

The user information database 280 may include stored data relating to a user or customer profile and user or customer accounts, such as for example, user identification, name, age, sex, birthday, address, account status, preferences, preferred language, greeting name, preferred communication channel, account numbers, order history, delivery history, authorized users associated with one or more accounts, account balances, account payment history, and other such typical account information. The user information database 280 may further include stored data relating to previous interactions between the organization (or its related entity) and a user. For example, the user information database 280 may store user interaction data that includes records of previous interactions with a user via a website, SMS, a chat program, a mobile application, an IVR system, or notations taken after speaking with a customer service agent. The user information database 280 may also include information about business transactions between the organization (or its related entity) and a user or customer that may be obtained from, for example, the transaction server 114.

The user information database 280 may also include user feedback data such as an indication of whether an automated interaction with a user was successful, online surveys filled out by a user, surveys answered by a user following previous interactions to the company, digital feedback provided through websites or mobile applications associated with the organization or its related entity (e.g., selecting a smiley face or thumbs up to indicate approval), reviews written by a user, complaint forms filled out by a user, information obtained from verbal interactions with user (e.g., information derived from a transcript of a customer service call with a user or customer that is generated using, for example, voice recognition techniques and/or by NLP device 124) or any other types of communications from a user or customer to the organization or its related entity. According to some embodiments, the functions provided by the user information database may also be provided by a database that is external to the dialogue learning module 120, such as the database 118 as shown in FIG. 1.

As will be discussed further with reference to FIG. 3, the memory 230 may also include an event queue 260 for temporarily storing queued events and a command queue 270 for temporarily storing queued commands. The processor 210 may receive events from the event queue 260 and in response to processing the event using the rule-based platform 290 and/or the trained machine learning model 295, may generate zero or more commands to be output to the command queue 270. According to some embodiments, the dialogue learning module 120 may place commands in the command queue 270 in the order they are generated. Each command may be designated to be executed by one or more devices, such as, for example, the web server 110, the call center server 112, the transaction server 114, the API server 122, or the NLP device 124 as shown in FIG. 1. Each such device (such as, for example, the API server 122 or NLP device 124) may continuously or intermittently monitor the command queue 270 to detect commands that are designated to be executed by the monitoring device and may access pertinent commands. The event queue 260 may receive events from other devices such as, for example, the user device 102, the web server 110, the call center server 112, the transaction server 114, the API server 122, and the NLP device 124 as shown in FIG. 1. According to some embodiments, events may be placed in the event queue 260 in a first-in first-out (FIFO) order, such that events may then be processed by the dialogue learning module 120 in the order they are received or generated.

The dialogue learning module 120 may also be communicatively connected to one or more memory devices (e.g., databases) locally or through a network. The remote memory devices may be configured to store information and may be accessed and/or managed by the dialogue learning module 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The dialogue learning module 120 may also include one or more I/O devices 220 that may comprise one or more interfaces for receiving signals or input from devices and providing signals or output to one or more devices that allow data to be received and/or transmitted by the dialogue learning module 120. For example, the dialogue learning module 120 may include interface components, which may provide interfaces to one or more input devices, such as one or more keyboards, mouse devices, touch screens, track pads, trackballs, scroll wheels, digital cameras, microphones, sensors, and the like, that enable the dialogue learning module 120 to receive data from one or more users (such as, for example, via the user device 102).

In example embodiments of the disclosed technology, the dialogue learning module 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the dialogue learning module 120 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the dialogue learning module 120 may include a greater or lesser number of components than those illustrated.

Figure 3:
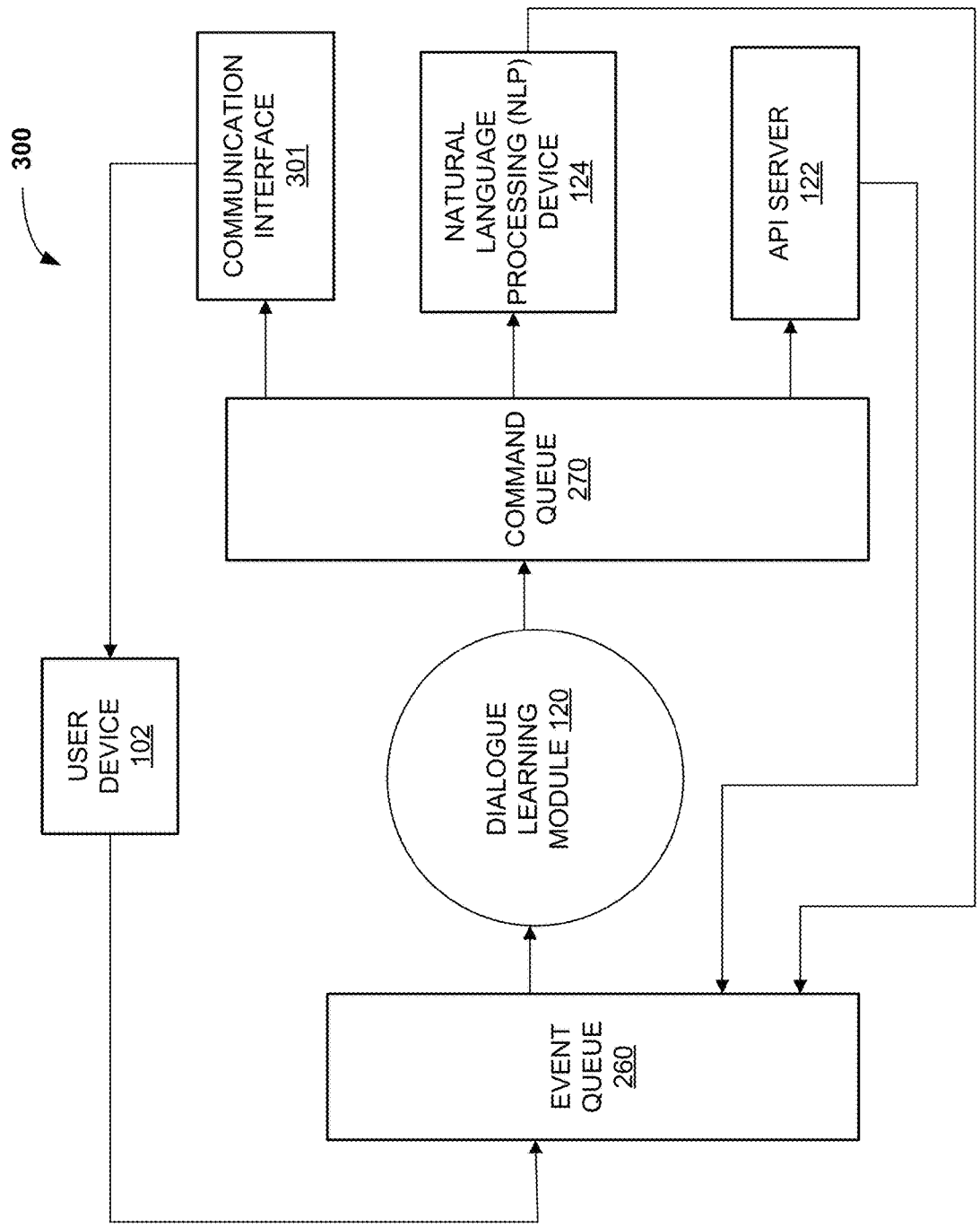
FIG. 3 is a block diagram 300 depicting functionality for validating and resolving a perceived irregularity using natural language processing and dialogue generation, according to an example implementation of the disclosed technology.

FIG. 3 is a block diagram 300 depicting example system functionality for validating and resolving to a user's perceived irregularity using natural language processing and dialogue generation. In certain example implementations, the dialogue learning module 120 may work in conjunction with the NLP device 124 via queues and feedback loops to: (a) autonomously interpret utterances/messages received from the user device 102; and (b) gather information pertinent to the interpreted utterances/messages; and (c) program the NLP device 124 (via commands) throughout the interaction(s) that may ultimately lead to validating the perceived irregularity as a true irregularity and/or invalidating the perceived irregularity. The methods disclosed herein may correspond to the block diagram 300 shown in FIG. 3, and may be performed by system 100 as discussed above and shown in FIG. 1 entirely or partially via the dialogue learning module 120 using the processor 210 to execute memory 230 as shown in FIG. 2, and optionally with other steps delegated to other elements in system 100, such as the user device 102, the web server 110, the call center server 112, the transaction server 114, the API server 122, and/or the NLP device 124.

Responsive to receiving incoming messages from the user device 102 (and/or other events placed in the event queue 260), the dialogue learning module 120 may generate and provide programming commands to the NLP device 124 via the command queue 270. The programming commands, for example, may cause the NLP device 124 to identify one or more investigational responses based on the interpreted contents of the incoming message. In certain implementations, an investigational response may be identified and output in the form of a specific response via the communication interface 301. In another example implementation, the investigational response may be identified and ultimately refined based on further information received from the dialogue learning module 120 (such as order status, delivery proof, rules, etc.) and output as a meaningful response to the incoming message. In certain example implementations, the investigational response may be identified and a resolution to the validated irregularity may be initiated.

In certain example implementations, there can be a pre-established solution space from which responses or resolution measures may be generated. In certain example implementations, the generated response can be a natural-language construct including confirmations and/or corrections of verifiable assertions.

In certain example implementations, the dialogue learning module 120 in conjunction with the NLP device 124 may be utilized to elicit additional information relevant to the initial message received from the user when insufficient information is available to generate an investigational response (e.g., when the hypothesis associated with the perceived irregularity has a confidence measurement less than a predetermined confidence threshold). For example, the NLP device 124 may be instructed by the dialogue learning module 120 to conduct additional dialogue with the user (via the user device 102) to: elicit relevant missing information, generate specific information-eliciting utterances, acquire supporting evidence, acquire contrary evidence, abandon a hypothesis, refine a hypothesis, and/or validate a perceived irregularity as a true irregularity.

In certain example implementations, the NLP device 124 may be instructed by the dialogue learning module 120 to generate and provide a response based solely on the initial message received from the user, particularly if the initial message received includes verifiable assertions that can be processed by the dialogue learning module 120.

In certain example implementations, the response may be output via the communication interface 301 in the form of textual, audible, and/or video information that is sent to the user for display/output on the user device 102 associated with the user. In other example implementations, a resolution to the perceived discrepancy may be output in the form of a refund, or an order for one or more products or services from a selected merchant for sending to the user or customer.

With continued reference to FIG. 3, a first event may be generated and placed in the event queue 260 in response to receiving a message. The event, for example, may be generated based on receiving a message and/or utterance sent via the user device 102. A message may be received via various communication mediums such as, for example, SMS, a voice-to-text device, a chat application, an instant messaging application, a mobile application, an IVR system, or any other such medium that may be sufficient to send and/or receive electronic communications. In some embodiments, the incoming message may be received by a device of the system 100, as discussed above with respect to FIG. 1, such as web server 110, call center server 112, API server 122, etc. An event may be generated by, for example, a RESTful API interfacing with the receiving device.

In certain example implementations, the event queue 260 may be configured to temporarily store a plurality of events. According to some embodiments, events are placed in the event queue in a first-in first-out (FIFO) manner, such that the events will be executed in the order that they were received. In some embodiments, the event queue 260 and/or the command queue 270 may be part of dialogue learning module 120. In some embodiments, both the event queue 260 and the command queue 270 may be present on a device or component other than the dialogue learning module 120. For example, in some examples, the event queue 260 and the command queue 270 may be maintained on a cloud server that is accessible by the dialogue learning module 120, the API server 122, the NLP device 124, and/or the communication interface 301. According to some embodiments, an event may represent different types of information that can trigger or present an opportunity to respond to a received message.

According to some embodiments, the dialogue learning module 120 may continuously or intermittently monitor the event queue 260. In response to detecting an event (e.g., the first event) in the event queue, the event may be received at the dialogue learning module 120 from the event queue 260. In some embodiments, the dialogue learning module 120 may include a rule-based platform, a trained machine learning model, and/or a database storing user context/order information that may be derived from user information associated with one or more users that is stored in other database such as, for example, the database 118 and/or database 280 as discussed above with respect to FIG. 1 and/or FIG. 2. In some embodiments, the user information may include one or more of account types, account statuses, transaction history, order status, delivery tracking status, proof of delivery, and conversation history. According to an example implementation of the disclosed technology, the user context/order information may allow the system 100 to generate customized responses for one or more users. According to some embodiments, the user context/order information may be updated by the dialogue learning module 120 upon receiving updated user or order information from, for example, the database 118.

The dialogue learning module 120 may, in response to processing the first event, generate a first command to be placed in a command queue 270. According to some embodiments, the dialogue learning module 120 may generate a command based on the processed event and/or the user context/order information using one or more of a rule-based platform 290 and a trained machine learning model 295, as discussed above with reference to FIG. 2. For example, in some use cases a command may be generated using the rule-based platform 290, whereas in other use cases, a command may be generated using the trained machine learning model 295, and further use cases may be handled by both working in concert. In some embodiments, the trained machine learning model 295 may be used as a way of enhancing the performance of the rule-based platform 290 by, for example, determining which rules have priority over other rules and what rules should be applied in a given context. According to some embodiments, the commands generated by the dialogue learning module 120 in response to a particular event may change as the user context/order information is updated over time. Further, changes to the rules in the rule-based platform 290 or further training of the machine learning model 295 may also result in different commands being generated in response to the same event based on previous results (e.g., successful resolution of a validated irregularity).

According to some embodiments, and in reference to the dialogue learning module discussed in FIG. 1, FIG. 2, and FIG. 3, the trained machine learning model 295 may be trained by updating an NLP database 174 (as discussed above with respect to FIG. 1) with communications from users that have been labeled using, for example, a web user interface. The data in the NLP database 174 may undergo supervised training in a neural network model using a neural network training algorithm while the model is offline before being deployed in the system 100. According to some embodiments, an NLP model of the system 100 may utilize deep learning models such as a convolutional neural network (CNN) and long short-term memory (LSTM). The NLP model may also be trained to recognize named entities in addition to intents. For example, a named entity may include persons, places, organizations, account types, and product types. According to some embodiments, when the dialogue learning module 120 generates a command, such as a first command, it may determine an entity that will execute the command, such as, for example, the API server 122, the NLP device 124, a communication interface 301, or some other device or component, such that only the determined type of entity may pull the command from the command queue 270. For example, in the embodiment shown in FIG. 3, the dialogue learning module 120 may determine that the first command is to be executed by the NLP device 124 in order to determine the meaning of the incoming message. According to some embodiments, at the time the dialogue learning module 120 creates a new command, the dialogue learning module 120 may also update the user information database 280 (or alternatively, external database 118) with information about a previous or concurrent transaction or user interaction.

In certain example implementations, the NLP device 124 may receive the first command from the command queue 270, execute the command, and generate a second event to be placed in the event queue 260. According to some embodiments, the NLP device 124 may continuously or intermittently monitor the command queue 270 to detect new commands and upon detecting a new command, may receive the command from the command queue 270. Upon receiving a command, the NLP device 124 may perform various functions depending on the nature of the command. For example, in some cases, NLP device 124 may determine the meaning of an incoming message in response to executing the command. According to some embodiments, NLP device 124 may determine the meaning of an incoming message and/or additional dialogue by utilizing one or more of the following artificial intelligence (AI) techniques: intent classification, named entity recognition, sentiment analysis, relation extraction, semantic role labeling, question analysis, rule extraction and discovery, and story understanding.

Intent classification may include mapping text, audio, video, or other media into an intent chosen from a set of intents, which represent what a user is stating, uttering, requesting, commanding, asking, or promising in, for example, an incoming message or communication. Intent classifications may include, for example, a request for an explanation for a perceived irregularity, a request for confirmation, an indication of satisfaction, or any other intent a user may have in communicating a message. Named entity recognition may involve identifying named entities such as persons, places, transaction values, organizations, account types, and product types in text, audio, video, or other media.

Sentiment analysis may involve mapping text, audio, video, or other media into an emotion chosen from a set of emotions. For example, a set of emotions may include positive, negative, anger, anticipation, disgust, distrust, fear, happiness, joy, sadness, surprise, and/or trust. Relation extraction may involve identifying relations between one or more named entities in text, audio, video, or other media. A relation may be for example, a "customer of" relation that indicates that a person is a customer of an organization. Semantic role labeling may involve identifying predicates along with roles that participants play in text, audio, video, or other media. An example of semantic role labeling may be identifying (1) the predicate "to sell", (2) Mary, who plays the role of Agent, (3) book, which plays the role of goods, and (4) John, who plays the role of recipient in the sentence "Mary sold the book to John." Question analysis may involve performing natural language analysis on a question, including syntactic parsing, intent classification, semantic role labeling, relation extraction, information extraction, classifying the type of question, and identifying what type of entity is being requested.

Rule extraction and discovery may involve extracting general inference rules in text, audio, video, or other media. An example of rule extraction may be extracting the rule that "When a person turns on a light, the light will light up" from "Matt turned on the light, but it didn't light up." Story understanding may involve taking a story and identifying story elements including (1) events, processes, and states, (2) goals, plans, intentions, needs, emotions, and moods of the speaker and characters in the story, (3) situations and scripts, and (4) themes, morals, and the point of the story.

In some cases, the NLP device 124 may perform natural language generation in response to receiving a command. According to some embodiments, the NLP device 124 may perform natural language generation by utilizing one or more of the following AI techniques: content determination, discourse structuring, referring expression generation, lexicalization, linguistic realization, and/or explanation generation.

Content determination may involve deciding what content to present to the user out of all the content that might be relevant. Discourse structuring may involve determining the order and level of detail in which content is expressed. Referring expression generation may involve generating expressions that refer to entities previously mentioned in a dialogue. Lexicalization may involve deciding what words and phrases to use to express a concept. Linguistic realization may involve determining what linguistic structures, such as grammatical constructions, to use to express an idea. Explanation generation may involve generating a humanly-understandable, transparent explanation of a conclusion, chain of reasoning, or result of a machine learning model. In the example embodiment shown in FIG. 3, the NLP device 124 may determine the meaning of the incoming message and convert it to a form that may be processed by the dialogue learning module 120. Accordingly, the second event generated by the NLP device 124 may represent a determined meaning of the incoming dialogue message and the NLP device 124 may send the second event to the event queue 260.

The dialogue learning module 120 may receive the second event from the event queue 260 in response to detecting it, as described above with respect to the dialogue learning module 120 receipt of the first event. In some embodiments, the dialogue learning module 120 may also update the user context/order information at this point by receiving updated user information from, for example, the database 118. The dialogue learning module 120 may, in response to processing the second event, generate a second command to be placed in a command queue 270. According to some embodiments, the dialogue learning module 120 may generate the second command based on the processed event, the user context/order information, and using one or more of a rule-based platform 290 and a trained machine learning model 295 as described above. In the example embodiment shown in FIG. 3, the second event may represent a user's request to know, for example, why they were charged for shipping, why they received a product or service that did not meet their expectations, and/or a shipping status update for a product ordered by the user. Based on the user context/order information, the rule-based platform 290 and/or trained machine learning model 295, the dialogue learning module 120 may decide, for example, using predictive analytics, that it has enough information to create a second event that represents instructions to an API associated with the API server 122 to look up order information related to the user and/or policy information related to the order. However, in some embodiments, the dialogue learning module 120 may decide that, for example, it requires more information and may instead create a second event that represents instructions to communication interface 301 to send a message to user device 102 requesting more information. Accordingly, based on the user context/order information, the rule-based platform 290, and the trained machine learning model 295, the dialogue learning module 120 may change or adapt its responses to a given request over time.

The dialogue learning module 120 may, in response to processing the second event, generate a second command to be placed in command queue 270. According to some embodiments, the dialogue learning module 120 may generate the second command based on the processed event, the user context/order information, and using one or more of rule-based platform 290 and trained machine learning model 295 in a fashion similar to the generation of the first command described above. According to some embodiments, the second command may represent a command to the API server 122 to retrieve user information, such as, for example, shipping amounts, order contents, delivery details, etc.

In some embodiments, the API server 122 may receive the second command from the command queue 270, execute the command, and generate a third event to be placed in the event queue 260. According to some embodiments, the API server 122 may continuously or intermittently monitor the command queue 270 to detect new commands and, upon detecting a new command, may receive the command from the command queue 270. Upon receiving a command, the API server 122 may perform various functions depending on the nature of the command. In some cases, the API server 122 may call up an API stored locally or remotely on another device, to retrieve user/order data, perform an account action (e.g., initiate a refund), and/or respond with an explanation for the perceived discrepancy. Accordingly, the third event may represent, for example, retrieved information, an acknowledgement of a validated irregularity, explanation for the validated irregularity, etc.

The dialogue learning module 120 may receive the third event from the event queue 260 in response to detecting it as described above. In some embodiments, the dialogue learning module 120 may also update the user context/order information at this point by receiving updated user information from, for example, the database 118.

The dialogue learning module 120 may, in response to processing the third event, generate a third command to be placed in the command queue 270. According to some embodiments, the dialogue learning module 120 may generate the third command based on the processed third event and/or the user context/order information using one or more of the rule-based platform 290 and the trained machine learning model 295 in a fashion like the generation of the first command described above. In some embodiments, the dialogue learning module 120 may also generate a response message in response to processing an event, such as the third event. In some embodiments, the dialogue learning module 120 may receive a response message as an event produced by the NLP device 124. According to some embodiments, the third command may represent a command or instruction to the communication interface 301 to transmit the response dialogue message to, for example, the user device 102.

The communication interface 301 may receive and execute the third command, which may cause the communication interface 301 to transmit (e.g., via SMS and/or voice) the response message to user device 102. In some embodiments, the communication interface 301 may continuously or intermittently monitor the command queue 270 for new commands and may receive the third command in response to detecting the third command in the command queue 270. According to some embodiments, the communication interface 301 may be a standalone device having some or all of the elements of the dialogue learning module 120 as shown in FIG. 2. In some embodiments, the communication interface 301 may be integrated into dialogue learning module 120 (e.g., as I/O device 220). In some embodiments, the communication interface 301 may be integrated into another device, such as, for example, the web server 110, the call center server 112, the transaction server 114, the API server 122, and/or the NLP device 124.

As shown in the example embodiments in FIG. 3 and also in FIG. 1, the system 100 may autonomously exchange messages or conduct dialogue with a user or customer utilizing the structure provided by the event queue 260, the dialogue learning module 120, the command queue 270, the API server 122, the NLP device 124, and the communication interface 301 to identify one or more triggers or opportunities to provide a response to the determined perceived discrepancy. That is, the system 100 may determine whether each event received by the dialogue learning module 120 triggers the system 100 to extract a perceived irregularity from one or more communications, validate the perceived irregularity as a true irregularity, provide a computer-generated dialogue response indicating a proposed resolution of the perceived irregularity based on the validation. In some embodiments, the proposed resolution may be an offer to autonomously provide a resolution to the user or to provide an explanation invalidating the perceived irregularity when the perceived irregularity cannot be validated. To accomplish this, the system 100 may generate a hypothesis associated with the perceived irregularity and determine one or more investigational strategies, including investigational responses and/or calls to data stores (e.g., database 118) to elicit additional information about the perceived irregularity. With each additional piece of information received, the system 100 may adjust a confidence measurement associated with the hypothesis, and when the confidence measurement reaches a predetermined threshold, the system 100 may determine that the hypothesis is correct, and validate the perceived irregularity as a true irregularity. When the system 100 validates an irregularity, it may additionally autonomously provide a resolution to the user. As part of this process, the system 100 may adaptively respond to user messages to leverage AI in the machine learning models and NLP device(s) to adaptively respond to user communications using natural language before and/or after identifying triggers to provide a response. Further, repeatedly updating a user context/order information may enable the system 100 to provide customized responses to individual users over time. Thus, in certain example implementations, by applying AI and/or machine-learning via the NLP device 124, and by repeatedly updating and maintaining the user context/order information (i.e., by the dialogue learning module 120) the system 100 may provide adaptive and/or customized responses to individual users based in part on their individual context. While FIG. 3 and the related description appear to show an example of a single cycle of events, it should be appreciated that multiple different cycles of events (with associated feedback) may be processed in parallel by the dialogue learning module 120. In some embodiments, the API server 122, the NLP device 124, and the communication interface 301 may operate asynchronously, which may allow their independent operation, for example, by separately pulling commands from command queue 270. Accordingly, the entire system may be stateless with no side effects to calling a particular function. That is, in some embodiments, the system 100 may translate each received event queue in isolation without referencing contextual data from other events in the command queue 270.

Certain example implementations of the disclosed technology may include two types of input: one-sided, non-interactive communication received from a user (such as utterances); and/or interactive, back-and-forth communication (such as a conversation) where a user interacts with the automated system 100.

Certain example implementations of the disclosed technology may include solution spaces that are (A) constrained, with multiple-choice solutions, (B) constrained, with solutions selectable from the full solution space, and/or (C) unconstrained.

Figure 4:
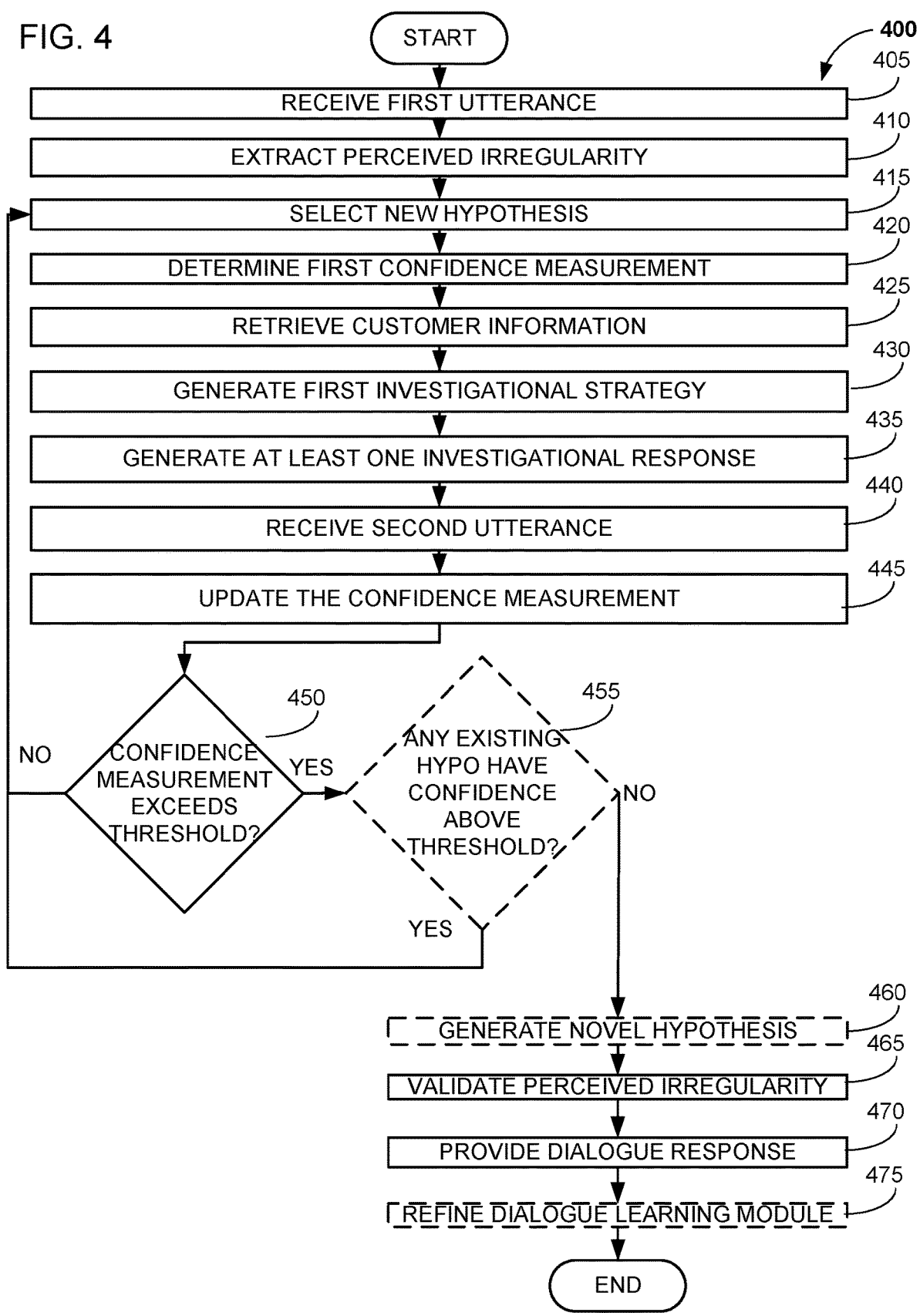
FIG. 4 is a flow diagram 400 illustrating examples of methods for validating and resolving a perceived irregularity using natural language processing and dialogue generation, in accordance with certain embodiments of the disclosed technology.

FIG. 4 is a flow diagram 400 illustrating examples of methods for validating and resolving a perceived irregularity using natural language processing and dialogue generation, in accordance with certain embodiments of the disclosed technology. In block 405, the system may receive a user communication. The user communication may be from a user, customer, or from another component of the system (e.g., web server 110, call center server 112, transaction server 114, and/or third-party server 126) that identifies dialogue learning module 120 as being able to identify whether the communication includes a perceived irregularity. In block 410, the system may extract a perceived irregularity from the communication. For example, extracting a perceived irregularity from the communication may include identifying information included in the communication, such as assertions of fact, expected outcomes, arguments, and/or other relevant information (e.g., language indicative to the system 100 that the communication includes a perceived irregularity). The system 100 may use NLP methods known in the art to parse the received communications into one or more observations for the dialogue learning module 120 to process as potential inputs for the validating the perceived irregularity as a true irregularity and, in some embodiments, autonomously resolving the irregularity (e.g., by providing a computer-generated dialogue response indicating a proposed resolution of the irregularity). For example, the system may use rules-based approaches, deep learning-based approaches, case-based reasoning approaches, and/or combinations of these methods for validating the perceived irregularity as a true irregularity. Validating the perceived irregularity may include identifying a specific user or customer (e.g., using named entity recognition processes to validate the identity of a specific user), receiving utterances from the specific user, extracting one or a series of observations from the communications (e.g., via NLP device 124 and/or dialogue learning module 120), and extracting rules and making inferences based on the received information (e.g., via dialogue learning module 120).

In block 415, the system 100 (e.g., dialogue learning module 120) may generate a hypothesis associated with the extracted perceived irregularity. In some embodiments, the system 100 may generate a plurality of hypotheses, each having an associated confidence measurement. The confidence measurement associated with each of the plurality of hypotheses may be indicative of how well the hypothesis fits the set of observations provided to the dialogue learning module 120. In some embodiments, the system 100 may seek to minimize the number of observations that are not accounted for by the generated hypothesis. In some embodiments, each observation received by the dialogue learning module 120 may include an associated relevancy quotient and an associated weighting factor. For example, a communication of "I ordered my pencils online, but why haven't they been shipped yet?" may include two observations having a high relevancy quotient, because dialogue learning module 120 may make calls to one or more databases (e.g., database 118) to verify this information as relevant to the perceived irregularity that is being communicated to the system by the user or customer. However, other assertions may be inherently irrelevant (e.g., when the system 100 is unable to correlate statements provided by the user to the perceived irregularity the user wishes to resolve in a collaborative process using the system's available case knowledge). In this case, dialogue learning module 120 may assign a low relevancy quotient to the respective observation. The associated weighting factor may be based on a variety of inputs, including the associated relevancy quotient. Thus, the relevancy quotient of a given observation may affect the confidence measurement of a generated hypothesis. For example, dialogue learning module 120 may assign a first hypothesis a higher confidence measurement than a second hypothesis when the first hypothesis leaves one observation having a low relevancy quotient unexplained, and the second hypothesis leaves one observation having a higher relevancy quotient unexplained. In some embodiments, the hypothesis having the highest confidence measurement may leave no observations unexplained, while in other embodiments, the hypothesis having the highest confidence quotient may leave one or more observations unexplained (e.g., observations having a low relevancy quotient). Accordingly, the system 100 is able to generate accurate hypotheses given imperfect or potentially irrelevant information (e.g., observations received by dialogue learning module 120). In block 420, the system (e.g., dialogue learning module 120) may determine a first confidence measurement associated with the generated hypothesis. In some embodiments, the system may generate a plurality of hypotheses associated with the perceived irregularity and may determine a confidence measurement for each of the plurality of hypotheses. The system may determine which hypothesis of the plurality of hypotheses to investigate first by ranking the generated hypotheses by order of their respective confidence measurements.

In some embodiments, the weighting factor may be based in part on data generated from previous user or customer interactions and/or data received from one or more external sources. For example, web server 110, call center server 112, transaction server 114, and/or API server 122 may communicate with the dialogue learning module 120 over the local network to provide the dialogue learning module 120 with data indicative of previous user or customer interactions. As part of an investigative strategy, the dialogue learning module 120 may also make one or more queries of a third-party server (e.g., third-party server 126) to identify historical patterns of fraudulent activity that may be associated with a specific geographic area, a particular merchant, or a particular season or time of year. The dialogue learning module 120 may also make queries of a third-party server to identify temporary conditions that may affect the weighting factor for any given hypothesis.

For example, the system may identify a historical pattern associated with a specific merchant over a specific timeframe. A user may initiate a session in order to dispute a charge from Nordstrom's department center store. The dialogue learning module 120 may receive translated intents from the NLP device 124 and make one or queries to reference the specific transaction referenced by the customer. The inference may determine that the time of year coincides with the peak holiday shopping season and determine that cases of true fraud historically spike during the peak shopping season. Accordingly, the dialogue learning module 120 may assign a higher weighting factor for a hypothesis that the perceived customer irregularity of a potentially fraudulent transaction at Nordstrom's corresponds to a case of true fraud.

In another example, the system may assign a higher weighting factor for a hypothesis associated with true fraud based on a historical pattern of a heightened occurrence of true fraud for a respective merchant or class of merchants. The system may receive and analyze transaction data for a respective merchant as part of an investigative strategy. A user or customer may wish to report a perceived irregularity associated with a potentially fraudulent charge to a popular meal delivery service. Based on historical customer data, the system may determine that meal delivery services are associated with a higher rate of incidence for true fraud as compared to most other lines of businesses. The dialogue learning module may make this determination based on previous customer transaction information for the respective meal delivery service, or based on customer transaction information for a similar meal delivery service or other merchant, and make an inference that the delivery service in question has an increased risk of true fraud compared to most other lines of business. Other lines of business associated with a potential for increased risk of fraud include movie streaming platforms, online gaming platforms, and other online subscriptions.

In another example, the system may assign a higher weighting factor for a hypothesis not associated with true fraud (e.g., an alternative explanation to the perceived irregularity). A user or customer may wish to request a chargeback because his delivery had a guaranteed delivery date of July 15$^{th}$ and the order had not arrived by the guaranteed date. However, the dialogue learning module may make one or more calls to retrieve user data associated with the transaction (e.g., from third-party server 126) and determine that the distribution center for the package or a destination address is located in an area currently suffering from wildfires, a hurricane, flooding, or some similar disastrous event that interferes with the normal flow of commerce. Accordingly, the system may assign a high weighting factor for hypotheses associated with an alternate explanation to the perceived irregularity. Continuing the example, the system may determine that the appropriate hypothesis is that the disaster has impacted shipping times and may interface with NLP device 124 to generate a message to the user informing the user of the natural disaster and recommending waiting an additional several days for the delivery to arrive.

In block 425, the system may retrieve user information. For example, the system may have received a communication that was translated into one or more observations by the dialogue learning module 120. In some embodiments, the system 100 may retrieve user information in order to determine a relevancy quotient for each of the observations. For example, the system 100 may retrieve information associated with a respective user and/or user transaction to determine relevancy of each observation received by the dialogue learning module 120. The user may provide an utterance that includes a credit card number, account identifier, transaction identifier, etc., and the system 100 may retrieve authentication information for the user based on the provided information. After being authenticated, the system may continue receiving utterances that include a perceived irregularity that may be extracted by the NLP device 124 and/or dialogue learning module 120. For example, the user may state that he or she does not recognize purchase number 6940 on their statement. The system may determine, based on stored transaction data (e.g., in database 118) that the purchase was made at a fast food restaurant local to the user. In order to prompt additional relevant information from the user, the system (e.g. via dialogue learning module 120 and NLP device 124) may provide the user with information associated with the respective transaction. In response, the user may provide additional contextual information that must be analyzed for relevancy. For example, the user may additionally, in one or more utterances, either prompted or unprompted by the system 100, may state (i) that he believes purchase 6940 is fraudulent because the user was out of town on the date of purchase and (ii) sometimes the user's child (or any authorized user of the customer's account) orders from the fast food restaurant when the user is out of town. The system may determine a high relevancy for both statements, and generate a hypothesis that the perceived irregularity (a fraudulent purchase) is not a true fraudulent transaction, because of the potential for the user's child to have made the purchase without the user's knowledge. Accordingly, the dialogue learning module 120 may generate instructions for the NLP device 124 to synthesize one or more investigational responses to elicit more information from the user. For example, the system may ask the user if the user's child is (i) an authorized user on the user's account and (ii) if it is possible that the child made purchase 6940 while the user was out of town. In some embodiments, the system may autonomously determine that the user's child placed the order if, for example, the user's child is listed as an authorized user in the user account data accessible to the system. In such an instance, the system may generate a response to the user reminding the user that other authorized users exist on his account, including the user's child.

The user may investigate and determine that his child indeed made the purchase, and confirm the perceived irregularity as false fraud either in the current session, or in a new session with system 100 (e.g., if the user's investigation requires additional fact-finding, he or she may choose to suspend the current session and resume once the user's fact finding is complete. The system 100 may generate a variety of investigational strategies based on a given hypothesis, including questions to direct the user to verify the timing of a particular transaction, whether the transaction was made in a card-present (e.g., chip) transaction, whether there are other authorized users of the respective payment method (e.g., when the authorized user may not be listed in the user account but has oral permission from the user account owner which needs to be verified by the user), etc. In some cases, the user may provide the system with information that contradicts information available to the system. In such a case, the system may attempt to share additional information associated with the perceived irregularity and/or transaction in order to verify the information provided by the user.

In block 430, the system may generate a first investigational strategy based on the determined hypothesis in block 420. The investigational strategy may include generating, by the dialogue learning module 120, one or more commands to the NLP device 124 to generate one or more investigational responses. It may further include calling to external components (e.g., database 118) to retrieve further user information based on the hypothesis associated with the perceived irregularity. The system 100 may additionally retrieve additional information from the rule-based platform 290, for example, utilizing case-based reasoning in order to analogize between the current perceived irregularity and past interactions with components of system 100 (e.g., dialogue learning module 120). For example, a current user problem could be identified as similar or identical to a previous problem based on a similarity metric, either domain-specific or domain-independent. Consequently, the system could retrieve a hypothesis corresponding to the previous problem and check whether that hypothesis would accurately explain the observations pertaining to the current problem. In block 435, the system may generate at least one investigational response. The investigational response may include one or more of a request for user clarification, eliciting additional information from the user, confirming one or more facts or observations about the perceived irregularity, etc. In block 440, the system 100 may receive a second communication or utterance. The second customer communication may be received in response to the one or more investigational responses generated the NLP device 124 based on one or more commands generated by the dialogue learning module 120. Based on the second communication, the system 100 may update the confidence measurement associated with the selected hypothesis in block 445. For example, the system may require four observations from the user in order to exceed a predetermined confidence threshold for a given hypothesis (e.g., a determination of a false fraud event—wherein the user believes fraudulent activity has occurred when it has not). The system may first authenticate a given user (e.g., by asking for a credit card number associated with the purchase). The system may determine, (e.g., by extracting one or more observations from utterances received and translated by NLP device 124) that the user believes someone has fraudulently used his credit card to subscribe to a popular music streaming service. Next, the system may generate a questions to prompt the user for information to build the confidence interval for a false fraud event. For example, dialogue learning module 120 may generate one or more command queues for NLP device 124 to generate questions for the user such as whether the user is still in possession of the card. A reply in the affirmative may drive the confidence interval for the given hypothesis higher, but not sufficient for a complete determination. Accordingly, the system may generate additional follow-up questions such as whether the user has given their card to anyone to use. Based on the reply, the system may selectively retrieve transaction information associated with the transaction (e.g. from database 118). The transaction information may show that the user has been subscribed to the music service for the last four months, with a recurring $2.99 monthly charge. The system may generate a plurality of hypotheses with associated confidence intervals based on this determination, (e.g., (i) a determination that the event is a charge dispute rather than a case of fraud, (ii) a determination that the event is a fraudulent charge the user did not discover for four months, and (iii) a determination that the user subscribed to the streaming service, but cannot recall. Although the system may have multiple competing hypothesis based on the given observations, these hypotheses may be concurrently investigated with the same investigational strategy. For example, the system may selectively provide the transaction history associated with the streaming purchase to the user by transmitting a transaction statement, an invoice, etc., through a component of system 100 (e.g., web server 110, call center server 112, etc.) or through another external means such as an email, SMS, etc., to see if the user may remember anything. The user may be prompted to recognize the transaction, and the customer irregularity may be resolved as a false fraud event.

In decision block 450, the system 100 may determine whether the confidence measurement associated with the selected hypothesis exceeds a predetermined threshold. When the system 100 determines that the confidence measurement does not exceed the predetermined threshold, the system may return to block 415 to select another hypothesis of a plurality of generated hypotheses. In some embodiments, the generated hypotheses may be selected from a plurality of preexisting hypotheses previously generated in a previous interaction between components of the system and a user or customer. In other embodiments, the system 100 may determine that none of the previously generated hypotheses fit the one or more observations associated with the current user session, and accordingly may generate a novel hypothesis in an attempt to validate the perceived irregularity as a true irregularity and autonomously resolve the validated irregularity (e.g., by providing a computer-generated dialogue response indicating a proposed resolution to the validated irregularity). When the confidence measurement exceeds the predetermined threshold, the system may move to one of optional blocks 455 or 460, or, in other embodiments, may proceed directly to block 465.

In optional block 455, the system 100 may determine that no preexisting hypotheses (for example, of those hypotheses generated in block 415) has a confidence measurement exceeding the predetermined threshold. In turn, the system 100 may either pass the perceived irregularity for external review (for example, by transferring the user to a live operator) or the system may move to optional block 460, in which the system generates a novel hypothesis (e.g., a hypothesis not previously generated by the system in the current user session or in any previous user session. The system 100 (e.g., via dialogue learning module 120) may generate a novel hypothesis using algorithmic methods of case planning, which may count each piece of relevant information received from the user as well as any information accessible to the system via the plurality of databases (e.g., database 118) as an observation. Generating a novel observation may include defining a hypothesis as a cost minimizing function, wherein failing to explain a respective observation has an associated cost. However, because each observation may be inherently irrelevant on its own as an indicator of a valid hypothesis (e.g., an observation with a low relevancy quotient), the system 100 may use a replanning algorithm to generate multiple, distinct, high-quality (or equivalently, low-cost) hypotheses. For example, the system may first generate a hypothesis that accounts for every observation, regardless of its relevancy quotient. Then, the algorithm may instruct the system 100 to generate a second hypothesis that ignores the first observation of the plurality of observations in determining the hypothesis. Similarly, the system may generate a third hypothesis that ignores a second observation of the plurality of observations. The process may continue for every given observation, such that for N observations, N hypotheses based on N−1 observations are generated. The system may additionally generate hypotheses based on discounting more than one observation. Continuing this example, N additional hypotheses may be generated based on N−2 observations. This process may continue until a single hypothesis is generated based on a single observation. Once all potential hypotheses are generated, each hypothesis may be evaluated for an associated confidence measurement, and the hypothesis having the highest confidence measurement may be selected as the novel hypothesis. This comprehensive approach may, depending on the domain-specific solution space, become prohibitive. Methods such as domain-specific heuristics and pruning can be used to increase efficiency. For example, a certain type of observation may be considered sufficient in deciding to commit to a certain hypothesis, based on domain-specific knowledge, thus eliminating the need to explore any additional hypotheses. In some embodiments, the system may determine that a hypothesis discounting one or more observations may have the highest confidence measurement (for example, when the respective observation has a low relevancy quotient).

In block 465, the system 100 may validate the perceived irregularity based on the selected hypothesis. The system may validate the perceived irregularity based on the confidence measurement meeting or surpassing the predetermined confidence threshold associated with the selected hypothesis. In block 470, the system may resolve the irregularity. For example, the system 100 may offer the customer one or more of a refund, a reschedule of a delivery, creation of a new order based on a previous order history, etc (e.g., by providing the user a computer-generated response indicating the proposed resolution). After block 470, the system may move to optional block 475, in which the system may refine the machine learning module. For example, if a novel hypothesis was generated in order to resolve the irregularity, the machine learning module 295 may extract heuristics and/or additional case-based logic to be added to, for example, the rule-based platform 290. Accordingly, when system 100 extracts a similar irregularity in a future user session, the system may be capable of determining that a preexisting hypothesis may explain a perceived irregularity without the need to generate a novel hypothesis. Thus, system 100 is capable of expanding its case-based reasoning supplied by rule-based platform 290 by utilizing machine learning techniques enabled by machine learning module 295.

Figure 5:
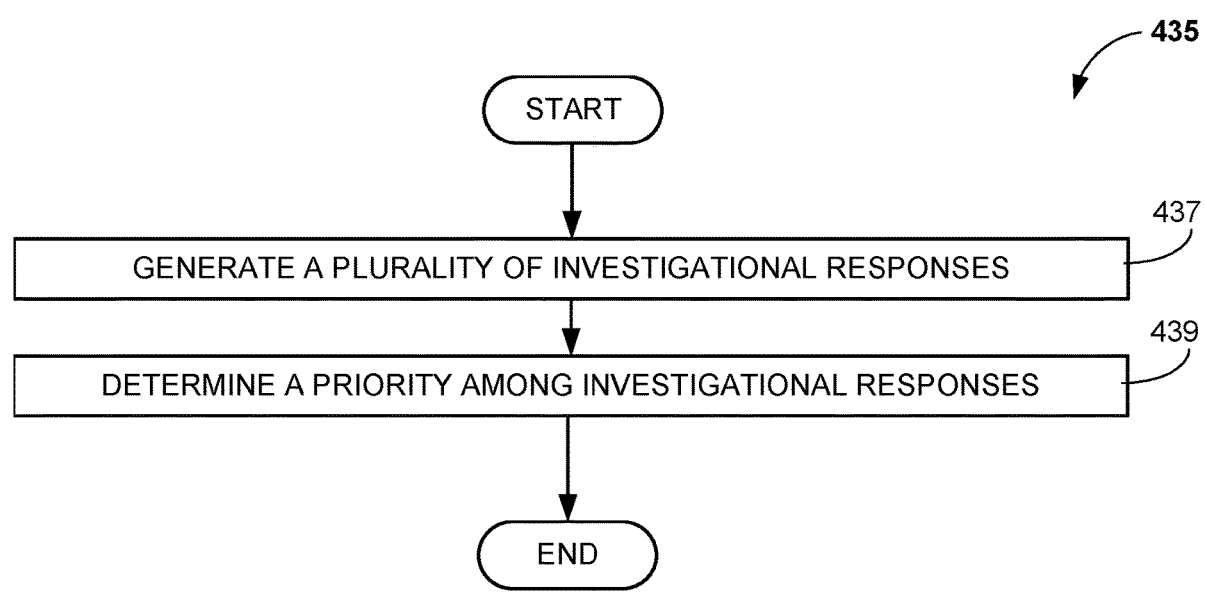
FIG. 5 is a flow diagram 435 for generating a plurality of investigational responses and determining a priority among the plurality of investigational responses, in accordance with certain embodiments of the disclosed technology.

FIG. 5 is a flow diagram 435 for generating investigational responses. In block 437, the system 100 may generate a plurality of investigational responses. For example, the system 100 may have identified a first hypothesis having a first confidence measurement associated with a perceived irregularity. Based on the first hypothesis, the system 100 may generate (e.g. by dialogue learning module 120) one or more investigational strategies, including an investigational response. In block 439, the investigational responses may be ranked by the system 100 and a highest ranked investigational response may be selected to be generated by NLP device 124. In some embodiments, the highest ranked investigational response may be based on using case-based reasoning, rules-based systems, a machine learning neural network, and/or combinations thereof to analogize to known investigational strategies from subject matter experts that may be categorized and stored internally on database 118. For example, the investigational response may be a request to elicit additional information, confirm a user's identity, verify aspects of a user account, etc.

According to certain example implementations of the disclosed technology, the term "dialogue" as used herein may refer to information and/or communication received from a user or customer and/or provided to a user or customer as part of the interaction(s) between the user and the system 100. In some implementations, such interactions may utilize certain communication channels (such as voice, e-mail, messaging, etc.) to exchange textual, audible and/or video information. Certain example implementations may utilize user history records and/or records of communications with human agents to provide additional context for the interaction between the user and the dialogue learning module. According to certain example implementations of the disclosed technology, the dialogue may be in the form of interactive (i.e., back-and-forth, two-way, conversation-like) communications between the user and the system 100. In some implementations, the dialogue may be in the form of non-interactive (i.e., single-sided, one-way, story-like) communications. In certain example implementations, records of interactive and/or non-interactive communications conducted with the user may be utilized. In certain implementations, such communication information may be obtained, for example, through a chat window, e-mail, phone call, etc., and/or recorded through textual, audible and/or video information channels.

In certain example implementations, the system 100 may execute instructions to conduct general dialogue with a user to identify a first trigger of a predetermined plurality of triggers. Upon identifying the first trigger, the system 100 may generate one or more responses. Optionally, in some embodiments, the system may generate general information-eliciting utterances. Regardless of whether additional information is required, the system 100 may generate one or more investigational responses. Upon doing so, the system may identify relevant missing information and generate specific information-eliciting responses.

In accordance with certain example implementations, the systems and methods disclosed herein include virtual assistants that utilize machine learning and/or other types of Artificial Intelligence (A.I.). systems to operate and interact with a user without the need for a human agent. It is frequently impossible for humans to perform the calculations performed by A.I. systems. For example, and as disclosed herein, the processing that the A.I. systems performs is often not pre-programmed and may vary depending on dynamic factors, such as the utterance input received, a time at which the input data set was processed, other input data previously processed, etc. For A.I. systems (such as those disclosed herein) that employ repeated or continuous learning, it may even be impossible to identify the particular algorithm(s) used to process a given input data set. These complexities indicate that A.I. systems are more than just a set of algorithms, but rather frameworks that are carefully designed in terms of input variables, hyperparameters, optimization variables, training data sets, validation data sets, etc. Certain algorithms may support and define a high-level A.I. framework but may or may not be the same algorithms that are used to process input data. In accordance with certain implementations of the disclosed technology, the machine-learning/A.I. framework disclosed herein performs a superior job (compared with a human) of identifying specific data-processing algorithms (e.g., in terms of machine-learning parameters). Thus, the A.I. system discussed herein may not utilize predefined computer algorithms and may extend well beyond mental processes and abstract ideas.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

A user or customer may place a call to system 100 (e.g., via call center server 112) believing that he has received and been charged for a purchase of a good or service that he or she did not order. Such perceived irregularities may be explainable in a variety of ways. For example, to illustrate a specific example implementation of the disclosed technology, the system may generate a plurality of hypotheses based on the given information. For example, the system may receive a communication containing an utterance such as: "I recently was charged for a subscription to National Geographic, but I never ordered this!" The system may determine that the perceived irregularity is associated with a subscription to National Geographic and may generate a plurality of hypotheses associated with the irregularity. For example, the system may generate a first hypothesis that posits that the subscription was erroneously charged to the user account and second hypothesis that posits that the subscription was properly charged to the user account, but the user is either unaware of the purchase (for example, if a user's family member has used the user's account to make the purchase without informing the user) or if the user has simply forgotten about the purchase. The system may calculate a confidence measurement associated with each hypothesis, and may refine the confidence measurement for each hypothesis in response to receiving additional user information from one or more accessible databases, and/or from additional utterances providing additional information. Continuing the example, the system may determine that the two most likely scenarios that explain the National Geographic subscription are (1) a potentially fraudulent purchase by another using the user's financial account or (2) the user (or related family member) made the purchase and forgot. Based on these hypotheses, the system may generate a follow up response to the user in order to elicit information and/or may look up additional information related to the user. For example, the system may look for fraudulent alerts associated with the user's financial account (e.g., via database 118) and may additionally generate a question, encouraging the user to provide more information (e.g., "have you recently lost your credit card or reported it stolen?"). The user may respond in the affirmative, or looking up the user's account information may show that a lost card was indeed reported. Accordingly, the system may increase the confidence measurement with the first hypothesis, and if it meets the predetermined threshold, may validate the perceived irregularity and autonomously resolve the irregularity. For example, the system may offer a refund for the fraudulent purchase and process the user to receive a replacement credit card.

In another example, the system may be capable of generating a novel hypothesis not previously generated by the dialogue learning module 120. This may occur in response to the rule-based platform not containing a previous user interaction having a sufficient similarity to the irregularity being currently presented. For example, when encountering the following communication: "I need to change the shipping address for order #6729, but I think it already shipped," the system may (via, e.g., NLP device 124) parse the communication and determine one or more factual observations that may be input to the dialogue learning module 120. The system may look up, in one or more databases order #6729 associated with the user and indeed verify order #6729. The rule-based platform 290 may not include a previous user case having had a similar pattern of circumstances. Accordingly, the system may generate a novel hypothesis that the user wishes for the package to be intercepted and redelivered to an updated address. The novel hypothesis may have an associated confidence measurement. For example, the confidence measurement may be based on information available to the system, such as an indication that the user recently moved to a new residence 2 months ago, but order #6729 lists an out of date address. The dialogue learning module may then produce one or more command queues to program the NLP device with information to elicit additional information needed to resolve the irregularity. Continuing the example, the system may ask the user to verify his or her identity and new mailing address before updating the shipping information for the order. While a novel hypothesis may, for example, be generated by planning from scratch (e.g., using AI planning techniques to generate a novel sequence of actions potentially explaining the known observations), previously-generated hypotheses can be reused in the hypothesis generation process through techniques such as case-based reasoning (e.g., identifying the current user problem as potentially similar to a previously-solved one, then retrieving a hypothesis corresponding to the previous problem and checking whether that hypothesis would accurately explain the observations pertaining to the current problem).

In another example, the system may interpret contextual information to extract an observation without being given information that directly identifies a given merchant, transaction, or event. For example, during a user interaction, the system may receive a user statement that he or she wishes to report a fraudulent credit card charge. After authenticating the user, the dialogue learning module prompts the NLP device to ask the user which transaction the user wishes to report as fraudulent. Instead of being provided a transaction identifier, the system may receive the following contextual information "I never went on a cruise in May—I've been quarantined all month!" The system may extract the following observations based on this statement. First, the transaction is for cruise line tickets, and that the time of the cruise is in May. Based on the provided contextual information, the system may retrieve transaction data associated with the cruise line purchase and collaboratively confirm this transaction as the identified transaction by sharing the retrieved information with the user. After confirming the correct transaction, the system may resolve the irregularity, by initiating a fraud resolution process based on the user's request. In another example of the system extracting observations from contextual information, a customer may wish to report a current fraud charge. During the collaborative investigational process between the system and the user, the user may inadvertently provide the following utterance: "It wasn't supposed to cost this much." Based on such a statement, the system may extract the following observations: (i) the user was aware of the transaction and (ii) the user merely wishes to dispute the charge.

In some embodiments, the system may generate novel hypotheses associated with resolving a customer irregularity based on case-based reasoning methods employed by the dialogue learning module. For example, the system may include data representative of learned inferences from previous user interactions with components of system 100. The system may have interacted with users of customers claiming a perceived irregularity with common food delivery applications (e.g., Uber Eats, DoorDash, etc.). These users may wish to report fraudulent activity, but in fact another authorized user of the account (e.g., a family member) may have made an order without the knowledge of the user or customer (e.g., using a family-shared application). In a new user session, the system may receive a utterance indicating a similar issue with a different food delivery application. The dialogue learning module may use case-based reasoning to determine a similarity between the preexisting user interactions and the current user interaction, and generate a hypothesis and investigative strategy to determine whether a similar problem has occurred (e.g., whether another authorized user made a purchase using the application without the knowledge of the user). These case-based reasoning methods may be expanded to allow the system to make similar inferences regarding other apps that have similar family-sharing potential (e.g., video streaming applications, music store applications, etc. based on an inference that these applications may have multiple authorized users that may inadvertently use the user's credit card for in-app purchases because the user's card is stored as the default payment option within the respective application.

In summary, the embodiments of the system described herein may provide a computer-generated dialogue response indicating a proposed resolution of a perceived irregularity after validation of the perceived irregularity as a true irregularity (e.g., based on a exceeding a predetermined confidence threshold). In some embodiments, the system may be configured to resolve perceived irregularities in which transaction data available to the system is contradicted by one or more statements or utterances made by the user. In this case, the system may selectively provide the transaction data to the user in order to provide the user additional context and prompt the user to remember the transaction (e.g. "Do you recognize this invoice?" "You can check your subscription data by visiting the following link.", etc.) After the user revisits information provided by the system, the system may verify whether the user recognizes the transaction, allowing the system to resolve the perceived irregularity. The system may attempt to bring the user and the system into a shared understanding of the perceived irregularity according to the available transaction data and the observations extracted from the user utterances. Once a shared understanding is established, the system may resolve the perceived irregularity by seeking explicit confirmation from the user on how the user wishes to proceed. When a shared understanding cannot be reached, the system may refer the user to a support agent or issue a refund, depending on applicable policies.

Examples of the present disclosure relate to systems and methods for resolving a irregularities using natural language processing. In one aspect, a system for resolving irregularities is disclosed. The system may implement a method according to the disclosed embodiments. The system may include one or more processors, a dialogue learning module and/or a natural language processing (NLP) device. The system may receive a customer communication comprising a first utterance. The system may extract, by the NLP device, a perceived irregularity related to a topic of the utterance based on the communication. The system may generate a first hypothesis associated with the perceived irregularity. The system may determine a first confidence measurement associated with the first hypothesis. The system may selectively retrieve first user information based on the first hypothesis. The system may receive a second utterance, and update the first confidence measurement based on the selectively retrieved first user information and the second utterance. The system may determine whether the updated first confidence measurement exceeds a first predetermined confidence threshold associated with the first hypothesis. In response to determining that the first confidence measurement exceeds the first predetermined confidence threshold, the system may validate the perceived irregularity based on the first hypothesis and provide a computer-generated dialogue response, by the natural language processing (NLP) device, indicative of a proposed resolution of the perceived irregularity based on the validation. Additionally, the system may refine the dialogue learning module based on resolving the first customer irregularity.

In some embodiments, the system may be further configured to generate a second hypothesis associated with the perceived irregularity and determine a second confidence measurement in response to determining that the first confidence measurement does not exceed the first predetermined confidence threshold. Additionally, the system may selectively retrieve second user information based on the second hypothesis and generate, by the dialogue learning module, a second investigational strategy associated with the second hypothesis. The system may generate, based on the second investigational strategy and by the Natural Language Processing (NLP) device, at least one investigational response. The system may receive a third utterance and update the second confidence measurement based on the selectively retrieved second user information and the third customer utterance. The system may determine that the updated second confidence measurement exceed a second predetermined confidence threshold associated with the second hypothesis and validate the perceived irregularity based on the second hypothesis. The system may provide a computer-generated dialogue response, by the natural language processing (NLP) device, indicative of a proposed resolution of the perceived irregularity based on the validation and refine the dialogue learning module based on resolving the first irregularity.

In some embodiments, the first hypothesis may be one of a plurality of existing hypothesis previously generated by the dialogue learning module and the second hypothesis may be a novel hypothesis not previously generated by the dialogue learning module.

In some embodiments, the machine learning module may be configured to generate a resolution response comprising an offer to resolve the first irregularity by providing a refund for a purchase associated with the topic.

In some embodiments, the computer-generated dialogue response may further comprise an action selected from an explanation of why the perceived irregularity is invalid, and a statement including the selectively retrieved user information.

In some embodiments, the at least one investigational response may further comprise specific information-eliciting communications to prompt additional utterances.

In some embodiments, the system may be further configured to flag the communication for external review upon a failure of the dialogue learning module to generate a valid hypothesis, the valid hypothesis having a respective confidence measurement exceeding a respective predetermined confidence threshold.

In another aspect, a method for resolving irregularities is disclosed. The method may include receiving a communication comprising a first utterance of a first user. The method may include extracting, by a Natural Language Processing (NLP) device a perceived irregularity related to a topic of the utterance. The method may include generating a first hypothesis associated with the perceived irregularity and determining a first confidence measurement associated with the hypothesis. The method may include, selectively retrieving, by the inference engine, first user information based on the first hypothesis and generating, by the dialogue learning module, a first investigational strategy associated with the first hypothesis. The method may include generating, based on the first investigational strategy and by the Natural Language Processing (NLP) device, a first plurality of investigational responses. The method may include determining a priority among the first plurality of investigational responses and selecting a first investigational response based on the determined priority. The method may include, receiving a second utterance and updating the first confidence measurement based on the selectively retrieved first user information and the second utterance. The method may include determining whether the updated first confidence measurement exceeds a first predetermined confidence threshold associated with the first hypothesis. In response to determining that the updated first confidence measurement exceeds the first predetermined confidence threshold, the method may include validating the perceived irregularity as a first irregularity based on the first hypothesis and providing a computer-generated dialogue response, by the natural language processing (NLP) device, indicative of a proposed resolution of the perceived irregularity based on the validation.

In some embodiments, the method may further include, responsive to determining that the first confidence measurement does not exceed the first predetermined confidence threshold, generating a second hypothesis associated with the perceived irregularity. The method may include determining a second confidence measurement associated with the second hypothesis. The method may include, selectively retrieving second user information based on the second hypothesis. The method may include generating, by the dialogue learning module, a second investigational strategy associated with the second hypothesis. The method may include generating, based on the second investigational strategy and by the Natural Language Processing (NLP) device, a second plurality of investigational responses. The method may include determining a priority among the second plurality of investigational responses and selecting a first investigational response based on the determined priority. The method may include, receiving a third utterance. The method may include updating the second confidence measurement based on the selectively retrieved second user information and the third utterance. The method may include determining that the second confidence measurement exceeds a second predetermined confidence threshold associated with the second hypothesis. The method may include validating the perceived irregularity based on the second hypothesis and providing a computer-generated dialogue response, by the natural language processing (NLP) device, indicative of a proposed resolution of the perceived irregularity based on the validation.

In some embodiments, the first hypothesis may be one of a plurality of existing hypotheses previously generated by the dialogue learning module and the second hypothesis is a novel hypothesis not previously generated by the dialogue learning module.

In some embodiments, the method may further include a dialogue learning module that is configured to generate a resolution response comprising an offer to resolve the first irregularity by providing a refund for a purchase associated with the topic.

In some embodiments, the computer-generated dialogue response may further include an action selected from an explanation of why the perceived irregularity is invalid and a statement including the selectively retrieved user information.

In some embodiments, the first investigational response may further include specific information-eliciting communications to prompt additional utterances.

In some embodiments, the method may further include flagging the communication for external review upon a failure of the dialogue learning module to generate a valid hypothesis, the valid hypothesis having a respective confidence measurement exceeding a respective predetermined confidence threshold.

In another aspect a system for resolving irregularities is disclosed. The system may include one or more processors, a dialogue learning module, and/or a Natural Language Processing (NLP) device. The system may extract, by the NLP device, a perceived irregularity related to a topic based on a communication including a first utterance by a first user. The system may generate a first hypothesis of a plurality of existing hypotheses associated with the perceived irregularity. The system may determine a first confidence measurement associated with the first hypothesis and selectively retrieve first user information associated with the perceived irregularity and based on the first hypothesis. The system may generate, by the dialogue learning module, a first investigational strategy associated with the first hypothesis and generate, by the Natural Language Processing (NLP) device and based on the first investigational strategy, a plurality of investigational responses. The system may determine a priority among the plurality of investigational responses including selecting a first investigational response. The system may receive a second utterance and update the first confidence measurement based on the selectively retrieved first user information and the second utterance. The system may determine that the updated first confidence measurement does not exceed a predetermined confidence threshold and generate a novel hypothesis associated with the perceived irregularity. The system may validate the perceived irregularity by one or more actions selected from retrieving additional user information and selecting at least a second investigational response of the plurality of investigational responses to prompt at least a third utterance. The system may resolve the first irregularity by providing a computer-generated dialogue response, by the natural language processing (NLP) device, indicating a proposed resolution of the perceived irregularity based on the validation. The system may update, by the dialogue learning module, the plurality of existing hypotheses with the novel hypothesis.

In some embodiments, the dialogue learning module may be configured to generate a resolution response including an offer to resolve the first irregularity by providing a refund for a purchase associated with the topic.

In some embodiments, the computer-generated dialogue response may further include an action selected from an explanation of why the perceived irregularity is invalid and a statement including the selectively retrieved user information.

In some embodiments, the first investigational response further includes specific information-eliciting communications to prompt additional utterances.

In some embodiments, the system may flag the customer communication for external review upon a failure of the dialogue learning module to generate a hypothesis having a respective confidence measurement exceeding a respective predetermined confidence threshold.

In some embodiments, updating the plurality of existing hypotheses further includes generating a predetermined confidence threshold associated with the novel hypothesis.

The invention claimed is:

1. A system comprising:
one or more processors;
a dialogue learning module comprising a first queue and a second queue;
a Natural Language Processing (NLP) device; and
memory in communication with the one or more processors and storing instructions that, when executed by the one or more processors, are configured to cause the system to:
receive a communication comprising a first utterance of a user;
responsive to receiving the communication, generate one or more events;
transmit the one or more events to the first queue to be processed by the dialogue learning module;
responsive to processing the one or more events, generate, by the dialogue learning module, one or more dynamic commands;
transmit the one or more dynamic commands to the second queue;
extract, by the NLP device and via a neural network algorithm, a perceived irregularity related to a topic of the first utterance based on the communication by receiving the one or more dynamic commands from the second queue;
extract historical user data associated with one or more second users;
generate a first hypothesis associated with the perceived irregularity, the first hypothesis based at least on the extracted historical user data;
determine contextual information corresponding to the first utterance, wherein the contextual information is different from the communication and the first utterance, wherein the contextual information comprises information about one or more individual's behaviour in relation to a transaction;
parse the communication into one or more observations based on the contextual information;
assign a respective weighting factor to each of the one or more observations, wherein the respective weighting factor is based on one or more of patterns of fraudulent activity, geographic area, merchant information, time frame, or combinations thereof;
determine a first confidence measurement associated with the first hypothesis, the first confidence measurement based on the respective weighting factor of each of the one or more observations;
selectively retrieve first user information based on the first hypothesis;
generate, by the dialogue learning module, a first investigational strategy associated with the first hypothesis;
receive a second utterance of the user;
update the first confidence measurement based on the selectively retrieved first user information and the second utterance;
determine whether the updated first confidence measurement exceeds a first predetermined confidence threshold associated with the first hypothesis; and
responsive to determining that the first confidence measurement exceeds the first predetermined confidence threshold:
validate, by the dialogue learning module, the perceived irregularity as a first irregularity based on the first hypothesis;
provide a computer-generated dialogue response, by the NLP device, indicating a proposed resolution of the perceived irregularity based on the validation; and
refine the dialogue learning module based on resolving the first irregularity.

2. The system of claim 1, wherein the instructions are further configured to cause the system to:
responsive to determining that the first confidence measurement does not exceed the first predetermined confidence threshold:
generate a second hypothesis associated with the perceived irregularity;
determine a second confidence measurement associated with the second hypothesis;

selectively retrieve second user information based on the second hypothesis;
generate, by the dialogue learning module, a second investigational strategy associated with the second hypothesis;
generate, based on the second investigational strategy and by the NLP device, at least one investigational response;
receive a third utterance;
update the second confidence measurement based on the selectively retrieved second user information and the third utterance;
determine that the updated second confidence measurement exceeds a second predetermined confidence threshold associated with the second hypothesis;
validate, by the dialogue learning module, the perceived irregularity as the first irregularity based on the second hypothesis;
provide a computer-generated dialogue response, by the NLP device, indicating a proposed resolution of the perceived irregularity based on the validation; and
refine the dialogue learning module based on resolving the first irregularity.

3. The system of claim 2, wherein the first hypothesis is one of a plurality of existing hypotheses previously generated by the dialogue learning module and the second hypothesis is a novel hypothesis not previously generated by the dialogue learning module.

4. The system of claim 2, wherein the computer-generated dialogue response further comprises a response selected from an explanation of why the perceived irregularity is invalid, and a statement including the selectively retrieved first user information or the selectively retrieved second user information.

5. The system of claim 2, wherein the at least one investigational response further comprises specific information-eliciting communications to prompt additional utterances.

6. The system of claim 1, wherein the dialogue learning module is configured to generate a resolution response comprising an offer to resolve the first irregularity by providing a refund for a purchase associated with the topic.

7. The system of claim 1, further comprising instructions that, when executed by the one or more processors, are configured to cause the system to:
flag the communication for external review upon a failure of the dialogue learning module to generate a valid hypothesis, the valid hypothesis having a respective confidence measurement exceeding a respective predetermined confidence threshold.

8. The system of claim 1, wherein determining whether the updated first confidence measurement exceeds the first predetermined confidence threshold is based at least in part on whether the one or more observations exceed a predetermined number of observations.

9. The system of claim 1, wherein the instructions are further configured to cause the system to:
determine a relevancy associated with the first user information, wherein the first investigational strategy is based on the relevancy.

10. The system of claim 1, wherein the instructions are further configured to cause the system to:
query a third-party server to identify the patterns of fraudulent activity associated with a first geographic area, a first merchant, or a first time frame.

11. The system of claim 1, wherein the instructions are further configured to cause the system to:
query a third-party server to identify one or more temporary conditions that affect the respective weighting factor for the first hypothesis.

12. A method for resolving irregularities, the method comprising:
receiving a communication comprising a first utterance of a first user;
responsive to receiving the communication, generating one or more events;
transmitting the one or more events to a first queue to be processed by a dialogue learning module;
responsive to processing the one or more events, generating, by a dialogue learning module, one or more dynamic commands;
transmitting the one or more dynamic commands to a second queue;
extracting, by a Natural Language Processing (NLP) device and via a neural network algorithm, a perceived irregularity related to a topic of the first utterance based on the communication by receiving the one or more dynamic commands from the second queue;
extracting historical user data associated with one or more second users;
generating a first hypothesis associated with the perceived irregularity, the first hypothesis based at least on the extracted historical user data;
determining contextual information corresponding to the first utterance, wherein the contextual information is different from the communication and the first utterance, wherein the contextual information comprises information about one or more individual's behaviour in relation to a transaction;
parsing the communication into one or more observations based on the contextual information;
assigning a respective weighting factor to each of the one or more observations, wherein the respective weighting factor is based on one or more of patterns of fraudulent activity, geographic area, merchant information, time frame, or combinations thereof;
determining a first confidence measurement associated with the first hypothesis, the first confidence measurement based on the respective weighting factor of each of the one or more observations;
selectively retrieving first user information based on the first hypothesis;
generating, by the dialogue learning module, a first investigational strategy associated with the first hypothesis;
generating, based on the first investigational strategy and by the NLP device, a first plurality of investigational responses;
determining a priority among the first plurality of investigational responses;
selecting a first investigational response based on the determined priority;
receiving a second utterance;
updating the first confidence measurement based on the selectively retrieved first user information and the second utterance;
determining whether the updated first confidence measurement exceeds a first predetermined confidence threshold associated with the first hypothesis; and
responsive to determining that the updated first confidence measurement exceeds the first predetermined confidence threshold:

validating, by the dialogue learning module, the perceived irregularity as a first irregularity based on the first hypothesis; and
providing a computer-generated dialogue response, by the NLP device, indicating a proposed resolution of the perceived irregularity based on the validation.

13. The method of claim 12, further comprising:
responsive to determining that the first confidence measurement does not exceed the first predetermined confidence threshold:
generating a second hypothesis associated with the perceived irregularity;
determining a second confidence measurement associated with the second hypothesis;
selectively retrieving second user information based on the second hypothesis;
generating, by dialogue learning module, a second investigational strategy associated with the second hypothesis;
generating, based on the second investigational strategy and by the NLP device, a second plurality of investigational responses;
determining a priority among the second plurality of investigational responses;
selecting a second investigational response based on the determined priority;
receiving a third utterance;
updating the second confidence measurement based on the selectively retrieved second user information and the third utterance;
determining that the second confidence measurement exceeds a second predetermined confidence threshold associated with the second hypothesis;
validating the perceived irregularity as the first irregularity based on the second hypothesis; and
providing a computer-generated dialogue response, by the NLP device, indicating a proposed resolution of the perceived irregularity based on the validation.

14. The method of claim 13, wherein the first hypothesis is one of a plurality of existing hypothesis previously generated by the dialogue learning module and the second hypothesis is a novel hypothesis not previously generated by the dialogue learning module.

15. The method of claim 13, further comprising a dialogue learning module configured to generate a resolution response comprising an offer to resolve the first irregularity by providing a refund for a purchase associated with the topic.

16. The method of claim 15, wherein the computer-generated dialogue response further comprises a response selected from an explanation of why the perceived irregularity is invalid, and a statement including the selectively retrieved first user information or the selectively retrieved second user information.

17. The method of claim 13, wherein the first investigational response further comprises specific information-eliciting communications to prompt additional utterances.

18. The method of claim 12, further comprising:
flagging the communication for external review upon a failure of the dialogue learning module to generate a valid hypothesis, the valid hypothesis having a respective confidence measurement exceeding a respective predetermined confidence threshold.

19. A system for resolving irregularities, the system comprising:
one or more processors;
a dialogue learning module comprising a first queue and a second queue;
a Natural Language Processing (NLP) device; and
memory in communication with the one or more processors and storing instructions that, when executed by the one or more processors, are configured to cause the system to:
transmit one or more events to the first queue to be processed by the dialogue learning module;
responsive to processing the one or more events, generate, by the dialogue learning module, one or more dynamic commands;
transmit the one or more dynamic commands to the second queue;
extract, by the NLP device and via a neural network algorithm, a perceived irregularity related to a topic based on a communication comprising a first utterance by a first user by receiving the one or more dynamic commands from the second queue;
extract historical user data associated with one or more second users;
generate a first hypothesis of a plurality of existing hypotheses associated with the perceived irregularity, the first hypothesis based at least on the extracted historical user data;
determine contextual information corresponding to the first utterance, wherein the contextual information is different from the communication and the first utterance, wherein the contextual information comprises information about one or more individual's behaviour in relation to a transaction;
parse the communication into one or more observations based on the contextual information;
assign a respective weighting factor to each of the one or more observations associated with the communication, wherein the respective weighting factor is based on one or more of patterns of fraudulent activity, geographic area, merchant information, time frame, or combinations thereof;
determine a first confidence measurement associated with the first hypothesis, the first confidence measurement based on the respective weighting factor of each of the one or more observations;
selectively retrieve first user information associated with the perceived irregularity and based on the first hypothesis;
generate, by the dialogue learning module, a first investigational strategy associated with the first hypothesis;
generate, by the NLP device and based on the first investigational strategy, a plurality of investigational responses;
determine a priority among the plurality of investigational responses including selecting a first investigational response;
receive a second utterance from the first user;
update the first confidence measurement based on the selectively retrieved first user information and the second utterance;
determine that the updated first confidence measurement does not exceed a predetermined confidence threshold;
determine that none of the plurality of existing hypotheses comprise a confidence measurement exceeding the predetermined confidence threshold;
generate a novel hypothesis associated with the perceived irregularity;

validate the perceived irregularity as a first irregularity by one or more actions selected from retrieving additional information and selecting at least a second investigational response of the plurality of investigational responses to prompt at least a third utterance from the first user;

provide a computer-generated dialogue response, by the NLP device, indicating a proposed resolution of the perceived irregularity based on the validation; and update, by the dialogue learning module, the plurality of existing hypotheses with the novel hypothesis.

20. The system of claim 19, wherein the dialogue learning module is configured to generate a resolution response comprising an offer to resolve the first irregularity by providing a refund for a purchase associated with the topic.

21. The system of claim 19, wherein the computer-generated dialogue response further comprises a response selected from an explanation of why the perceived irregularity is invalid, and a statement including the selectively retrieved first user information.

22. The system of claim 19, further comprising instructions that, when executed by the one or more processors, are configured to cause the system to:

flag the communication for external review upon a failure of the dialogue learning module to generate a hypothesis having a respective confidence measurement exceeding a respective predetermined confidence threshold.

23. The system of claim 19, wherein updating the plurality of existing hypotheses further comprises associating a first confidence measurement with the novel hypothesis.

* * * * *